US012623680B2

(12) United States Patent
Fan et al.

(10) Patent No.: US 12,623,680 B2
(45) Date of Patent: May 12, 2026

(54) NAVIGATION METHOD AND APPARATUS, DEVICE, STORAGE MEDIUM, AND PROGRAM PRODUCT

(71) Applicant: TENCENT TECHNOLOGY (SHENZHEN) COMPANY LIMITED, Shenzhen (CN)

(72) Inventors: Jingbo Fan, Shenzhen (CN); Qian Chen, Shenzhen (CN); Lingfang Pang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 57 days.

(21) Appl. No.: 18/887,735

(22) Filed: Sep. 17, 2024

(65) Prior Publication Data

US 2025/0010877 A1     Jan. 9, 2025

Related U.S. Application Data

(63) Continuation of application No. PCT/CN2023/082096, filed on Mar. 17, 2023.

(30) Foreign Application Priority Data

May 19, 2022     (CN) .......................... 202210545998.8

(51) Int. Cl.
*B60Q 1/00* (2006.01)
*B60K 35/28* (2024.01)
*B60W 50/14* (2020.01)

(52) U.S. Cl.
CPC ............. *B60W 50/14* (2013.01); *B60K 35/28* (2024.01); *B60K 2360/166* (2024.01);
(Continued)

(58) Field of Classification Search
CPC ........... B60W 50/14; B60W 2050/146; B60W 2420/403; B60W 2420/408;
(Continued)

(56) References Cited

U.S. PATENT DOCUMENTS 7,502,685 B2 *  3/2009  Nakamura ......... G01C 21/3632
                                                            345/589
9,019,173 B2 *  4/2015  Bast ................... G01C 21/3632
                                                            345/441
(Continued)

FOREIGN PATENT DOCUMENTS

CN          101750080 A      6/2010
CN          111220174 A      6/2020
(Continued)

OTHER PUBLICATIONS

The World Intellectual Property Organization (Wipo) International Search Report for PCT/CN2023/082096 Jun. 27, 2023 7 Pages (including translation).

*Primary Examiner* — Toan N Pham
(74) *Attorney, Agent, or Firm* — Anova Law Group, PLLC

(57) ABSTRACT

A navigation method includes displaying a navigation interface, the navigation interface being configured for navigating a target vehicle; displaying, in the navigation interface, a navigation map and a virtual vehicle that moves in the navigation map as the target vehicle travels; and displaying, between a moment when the virtual vehicle moves to a target distance from a curve and a moment when the virtual vehicle enters the curve, both the navigation map and a front of vehicle direction of the virtual vehicle deviate a plurality of times in a direction opposite to the curve, deviation degrees of the plurality of deviations gradually increasing in time sequence.

20 Claims, 9 Drawing Sheets

(52) U.S. Cl.
CPC ............................ *B60K 2360/171* (2024.01);
*B60K 2360/1868* (2024.01); *B60W 2050/146*
(2013.01); *B60W 2420/403* (2013.01); *B60W
2420/408* (2024.01); *B60W 2520/10* (2013.01);
*B60W 2552/30* (2020.02); *B60W 2556/40*
(2020.02)

(58) Field of Classification Search
CPC ......... B60W 2520/10; B60W 2552/30; B60W
2556/40; B60K 35/28; B60K 2360/166;
B60K 2360/171; B60K 2360/1868; G01C
21/367; G01C 21/3658
See application file for complete search history.

(56) References Cited

U.S. PATENT DOCUMENTS

| | | | |
|---|---|---|---|
| 2010/0145612 A1 | 6/2010 | Duan et al. | |
| 2010/0235093 A1* | 9/2010 | Chang ................. | G01C 21/367 |
| | | | 701/532 |

FOREIGN PATENT DOCUMENTS

| | | |
|---|---|---|
| CN | 113029165 A | 6/2021 |
| CN | 115112144 A | 9/2022 |
| JP | H0781603 A | 3/1995 |
| JP | H1038588 A | 2/1998 |
| JP | H1089988 A | 4/1998 |

* cited by examiner

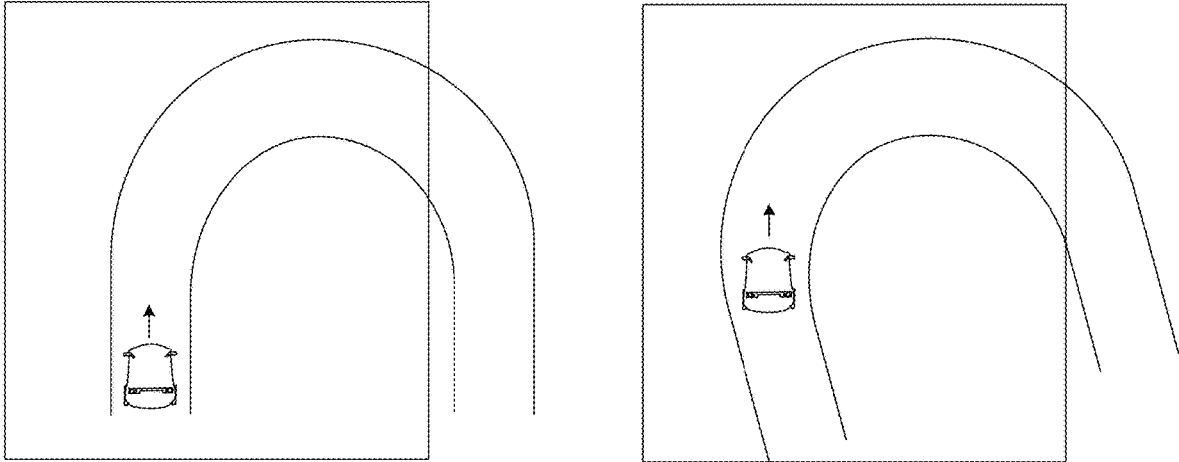

Note: A part in a block can represent a navigation map displayed in a navigation interface

FIG. 2

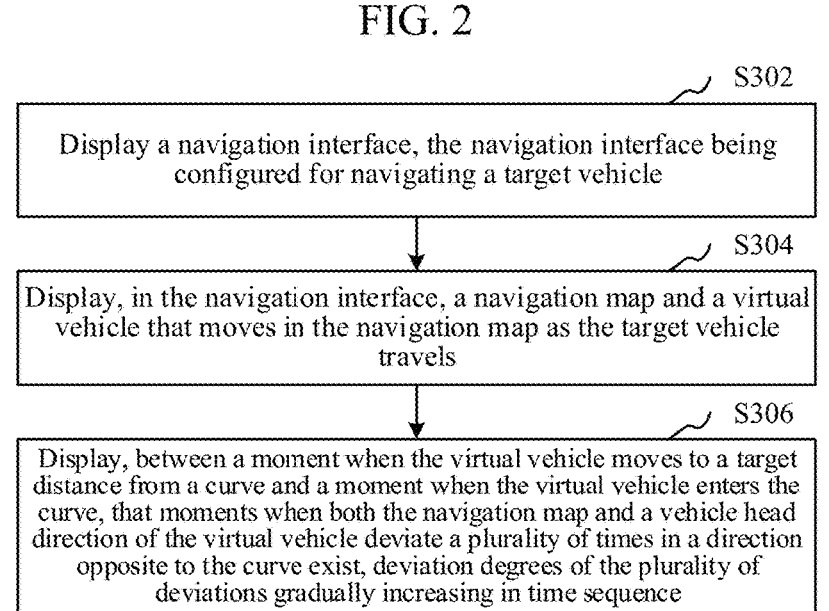

S302

Display a navigation interface, the navigation interface being configured for navigating a target vehicle

S304

Display, in the navigation interface, a navigation map and a virtual vehicle that moves in the navigation map as the target vehicle travels

S306

Display, between a moment when the virtual vehicle moves to a target distance from a curve and a moment when the virtual vehicle enters the curve, that moments when both the navigation map and a vehicle head direction of the virtual vehicle deviate a plurality of times in a direction opposite to the curve exist, deviation degrees of the plurality of deviations gradually increasing in time sequence

FIG. 3

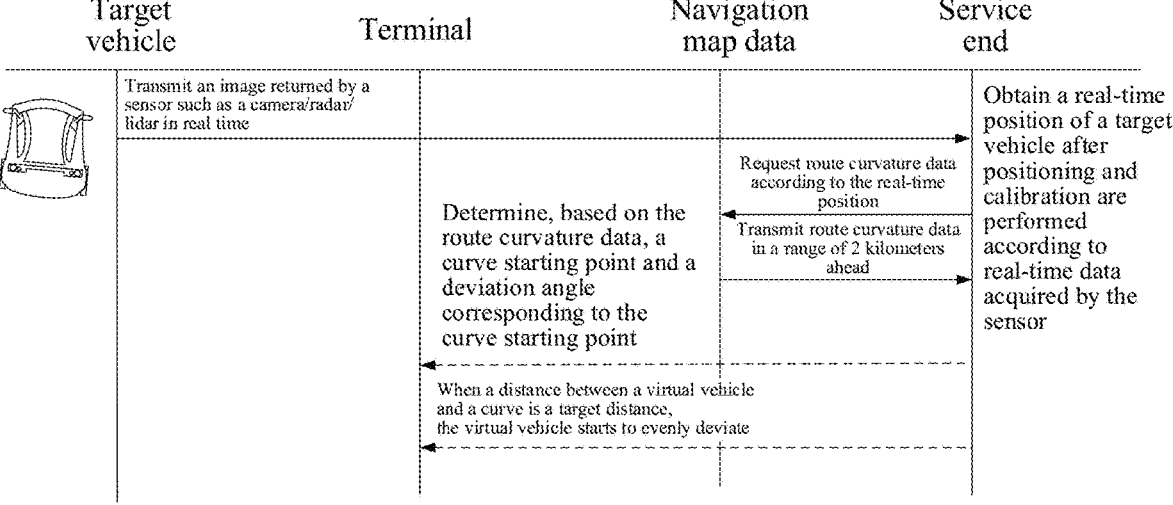

| Target vehicle | Terminal | Navigation map data | Service end |
|---|---|---|---|
| Transmit an image returned by a sensor such as a camera/radar/lidar in real time | | | Obtain a real-time position of a target vehicle after positioning and calibration are performed according to real-time data acquired by the sensor |
| | Determine, based on the route curvature data, a curve starting point and a deviation angle corresponding to the curve starting point | Request route curvature data according to the real-time position | |
| | | Transmit route curvature data in a range of 2 kilometers ahead | |
| | When a distance between a virtual vehicle and a curve is a target distance, the virtual vehicle starts to evenly deviate | | |

FIG. 8

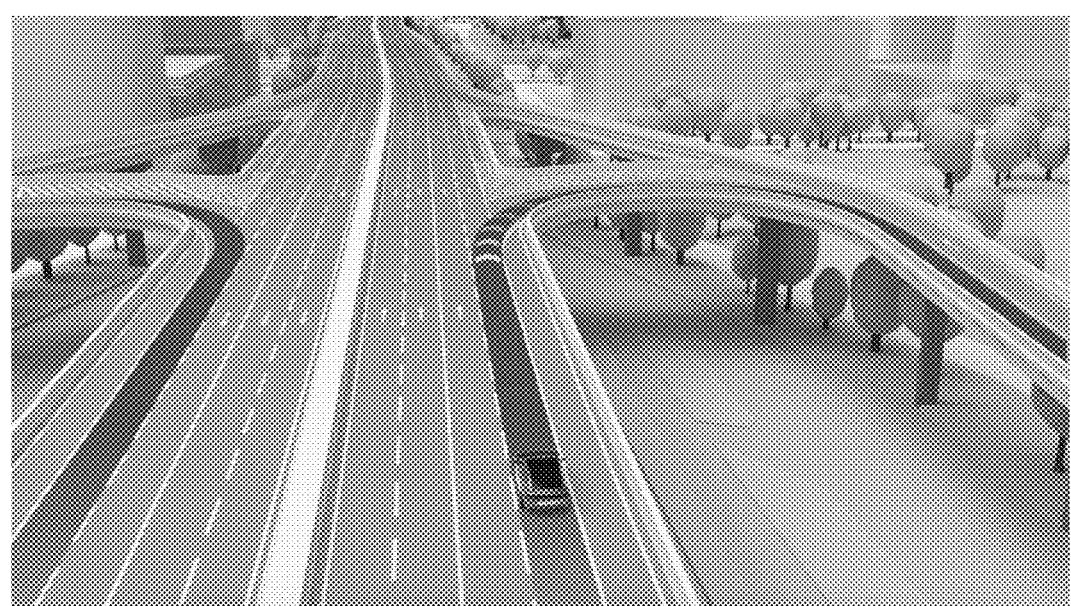

FIG. 9

NAVIGATION METHOD AND APPARATUS, DEVICE, STORAGE MEDIUM, AND PROGRAM PRODUCT

RELATED APPLICATIONS

This application is a continuation of PCT Application No. PCT/CN2023/082096, filed on Mar. 17, 2023, which claims priority to Chinese Patent Application No. 202210545998.8, filed with the China National Intellectual Property Administration on May 19, 2022, and entitled "NAVIGATION METHOD AND APPARATUS, DEVICE, STORAGE MEDIUM, AND PROGRAM PRODUCT", which are incorporated herein by reference in their entirety.

FIELD OF THE TECHNOLOGY

This application relates to the field of computer technologies, and in particular, to a navigation method and apparatus, a computer device, a storage medium, and a computer program product.

BACKGROUND OF THE DISCLOSURE

With the development of computer technology and positioning technologies, vehicles often navigate based on electronic maps. The orientation of a navigation map is often with the front of the vehicle facing upward ("heading-up"). In the navigation map in which the orientation is having the front of the vehicle facing upward, the top of a navigation map always changes with the travelling direction of the vehicle, and the front of vehicle maintains the heading-up orientation. Thus, the vehicle can be efficiently and conveniently guided to travel through left and right turning directions.

On such a navigation map, when the vehicle travels into a curve, the navigation map dramatically rotates, causing dizziness to the driver and poor user experience. In addition, there is a large difference between the displayed navigation maps before and after the map rotates dramatically. This change leads to a poor display effect, and requires that more content is rendered and displayed at once, resulting in an increase in the resources required to read map data and an increase in consumed resources.

SUMMARY

A navigation method includes: displaying a navigation interface, the navigation interface being configured for navigating a target vehicle; displaying, in the navigation interface, a navigation map and a virtual vehicle that moves in the navigation map as the target vehicle travels; and displaying, between a moment when the virtual vehicle moves to a target distance from a curve and a moment when the virtual vehicle enters the curve, both the navigation map and a front of vehicle direction of the virtual vehicle deviate a plurality of times in a direction opposite to the curve, deviation degrees of the plurality of deviations gradually increasing in time sequence.

A computer device is provided, including a memory and a processor, the memory having computer-readable instructions stored therein, and the processor performing the foregoing navigation method.

A non-transitory computer-readable storage medium is provided, having computer-readable instructions stored therein, the computer-readable instructions being executed by a processor to perform the foregoing navigation method.

BRIEF DESCRIPTION OF THE DRAWINGS

Accompanying drawings, which are incorporated herein and constitute a part of this specification, illustrate embodiments consistent with this application and, together with the specification, serve to explain the principles of this application. Apparently, the accompanying drawings described below are only some embodiments of this application, and a person of ordinary skill in the art can obtain other accompanying drawings according to these accompanying drawings without creative efforts.

FIG. 2 is a schematic diagram in which a navigation orientation is heading-up according to an embodiment of the present disclosure.

FIG. 3 is a schematic flowchart of a navigation method according to an embodiment of the present disclosure.

FIG. 8 is a diagram of a time sequence of computing device interaction according to an embodiment of the present disclosure.

FIG. 9 is a schematic diagram in which a front of vehicle direction reversely rotates toward a curve before the curve is entered according to an embodiment of the present disclosure.

DESCRIPTION OF EMBODIMENTS

To make objectives, technical solutions, and advantages of this application clearer and more understandable, this application is further described in detail below with reference to accompanying drawings and embodiments. The specific embodiments described herein are merely used to explain this application but are not intended to limit this application.

"Embodiment" mentioned in this specification means that particular features, structures, or characteristics described with reference to the embodiment may be included in at least one embodiment of this application. The term appearing at different positions of the specification may not refer to the same embodiment or an independent or alternative embodiment that is mutually exclusive with another embodiment. A person skilled in the art explicitly or implicitly understands that the embodiments described in this application may be combined with other embodiments. The terms "first", "second", and the like introduced in this application are intended to distinguish between similar objects, and are not necessarily intended to describe a specific order or sequence.

Figure 1:
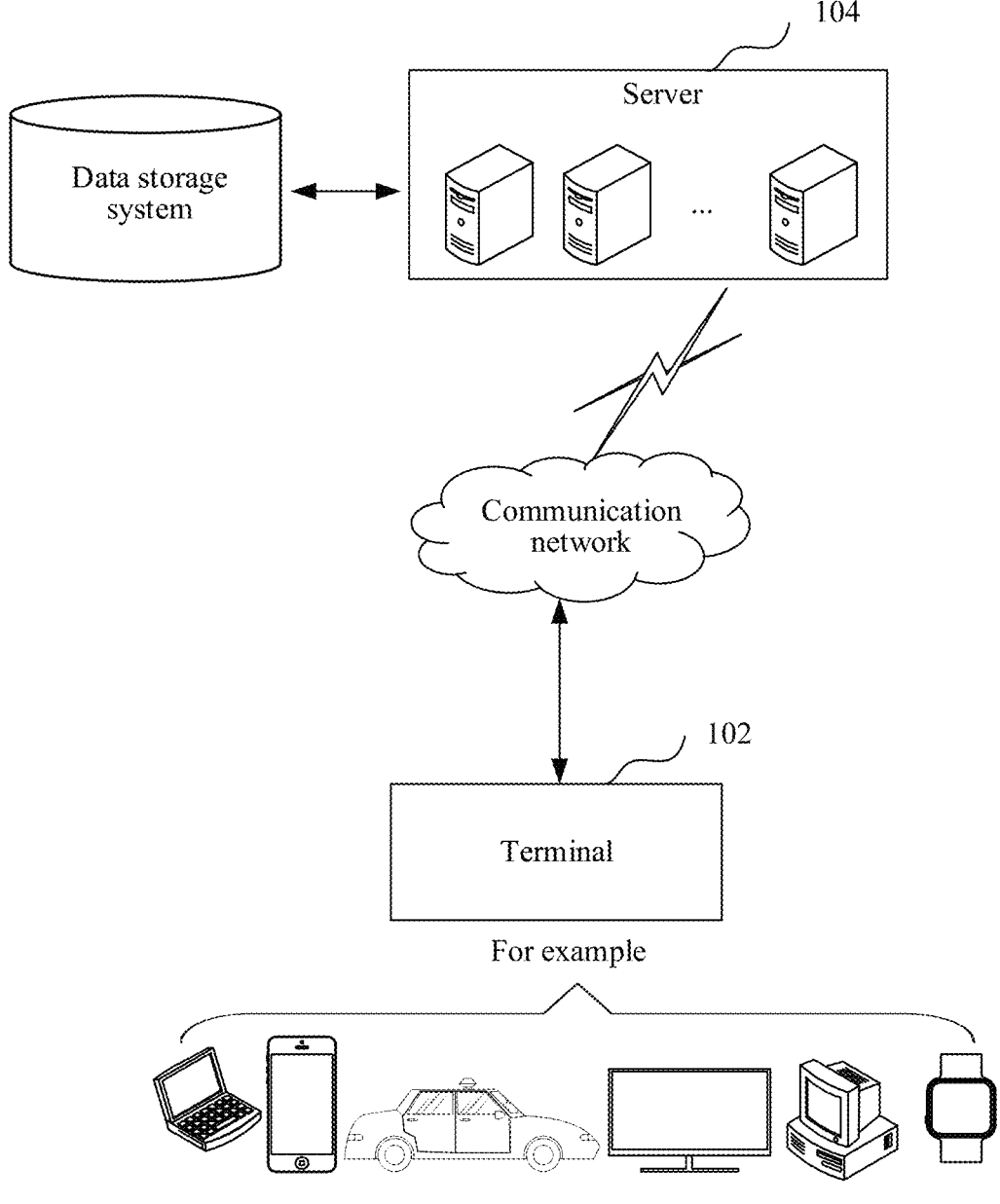
FIG. 1 is a diagram of an application environment of a navigation method according to an embodiment of the present disclosure.

FIG. 1 is a diagram of an application environment of a navigation method according to embodiments of the present disclosure. A terminal 102 communicates with a server 104 via a communication network. The terminal 102 may interact with the server 104 via the communication network. A data storage system may store data that the server 104 needs to process. The data storage system may be integrated on the server 104, or placed on a cloud or another server. In one embodiment, the server 104 provides a navigation service for the terminal 102. During navigation of a target vehicle, the terminal 102 displays a navigation interface, where the navigation interface is configured for navigating the target vehicle; displays a navigation map and a virtual vehicle that moves in the navigation map as the target vehicle travels in the navigation interface; and displays, in the navigation interface, that the navigation map and a front of vehicle direction of the virtual vehicle simultaneously deviate in a direction opposite to a curve at the same time, where the deviation starts before the virtual vehicle moves into the curve and when a distance between the virtual vehicle and the curve is a target distance until the virtual vehicle moves into the curve, and the target distance enables a deviation degree after the virtual vehicle moves into the curve to be consecutive with a deviation degree before the virtual vehicle moves into the curve.

In one embodiment, an electronic map client may be run on the terminal 102. The electronic map client may support vehicle navigation. When a driver drives the target vehicle, the driver may use the terminal 102 to start the electronic map client to navigate the target vehicle. During navigation, the server 104 communicates with the terminal 102 via a network, obtains positioning information about the target vehicle and road information of a travelling road, and calculates the navigation map and the front of vehicle direction of the virtual vehicle in the navigation interface. When the distance between the virtual vehicle and the curve is the target distance, the navigation map and the front of vehicle direction of the virtual vehicle start to deviate in the direction opposite to the curve, so that the terminal 102 implements the navigation method provided in the embodiments of this application. The terminal 102 may be, but not limited to, a desktop computer, a notebook computer, a smart phone, a tablet computer, an Internet of Things device, and a portable wearable device. The Internet of Things device may be a smart speaker, a smart television, a smart air condition, a smart voice interaction device, a smart in-vehicle device, or the like. The portable wearable device may be a smart watch, a smart band, a head-mounted device, or the like. The server 104 may be implemented by an independent server or a server cluster formed by a plurality of servers. The embodiments of this application may be applied to various scenarios, including but not limited to, cloud technology, artificial intelligence, intelligent transportation, assisted driving, and the like.

Usually, for electronic map navigation that can be used in vehicles, a navigation orientation usually includes heading-up and north-up. In a navigation map in which the navigation orientation is heading-up, the top of the navigation map always changes with the travelling direction of the vehicle, and the front of vehicle maintains its facing of directly above. As shown in FIG. 2, whether travelling straightly or passing through a curve, the virtual vehicle in the navigation map is presented in a direction with front of vehicle facing up, and the navigation map changes with the front of vehicle direction of the virtual vehicle. Accordingly, the vehicle can be efficiently and conveniently guided to travel through left and right. In a navigation map in which the navigation orientation is north-up, route navigation needs to be performed through a direction or through adjusting an orientation of a mobile phone to be north. Compared with the navigation orientation with the heading-up orientation, when in the north-up orientation, the navigation experience is poor, but it is convenient to obtain the orientation of the vehicle.

In a navigation mode of the heading-up orientation, when the target vehicle travels into the curve, due to a dramatic increase in a curvature of a road, the navigation map may rotate dramatically, there is a large difference between displayed navigation maps before and after the dramatic rotation, and rendering and display needs to be performed at once. Accordingly, the costs of resources required to read map data in a short time increase, and the driver can easily get dizzy.

According to the navigation method provided in the embodiments of this application, during navigation of a target vehicle, a navigation interface is displayed for navigation of the target vehicle. The navigation interface includes a navigation map and a virtual vehicle that moves in the navigation map as the target vehicle travels. That the navigation map and a front of vehicle direction of the virtual vehicle simultaneously deviate in a direction opposite to a curve is displayed in the navigation interface, where the deviation starts before the virtual vehicle moves into the curve and a distance between the virtual vehicle and the curve is a target distance, and the target distance enables a deviation degree after the virtual vehicle moves into the curve to be consecutive with a deviation degree before the virtual vehicle moves into the curve; and the navigation map and the front of vehicle direction of the virtual vehicle no longer maintain the same direction, for example, maintain the heading up orientation, but start to deviate in the direction opposite to the curve until the virtual vehicle moves into the curve. Since the front of vehicle direction deviates in advance, rotation duration of the front of vehicle direction increases, and a rotation speed of the front of vehicle direction when the vehicle moves into the curve decreases, so that the navigation map does not rotate dramatically due to a dramatic increase in a road curvature when the target vehicle travels into the curve. Accordingly, costs of resources for reading map data in a short time decrease, dizziness of the driver decreases, thereby improving user experience.

In one embodiment, as shown in FIG. 3, a navigation method is provided. An example in which the method is applied to the terminal 102 shown in FIG. 1 is used for description. The method includes the following operations.

Operation S302: Display a navigation interface, the navigation interface being configured for navigating a target vehicle.

The navigation interface is an interface for displaying an electronic navigation map, and the target vehicle is a vehicle travelling on an actual road during vehicle navigation.

Specifically, when the vehicle navigation is required, a user may start, through a terminal, an application program supporting the vehicle navigation, and display the navigation interface in the navigation application. The navigation interface is configured for navigating the target vehicle.

Operation S304: Display, in the navigation interface, a navigation map and a virtual vehicle that moves in the navigation map as the target vehicle travels.

An electronic map related to roads in the navigation interface is referred to as a navigation map. During navigation of the target vehicle, the navigation interface further includes a virtual vehicle corresponding to the target vehicle. Certainly, the target vehicle may alternatively be denoted in the navigation interface through another mark, such as an arrow or a circle.

In some embodiments, the navigation interface may have a plurality of navigation orientations, including heading-up and north-up. The front of vehicle facing up, or heading-up, means that the top of the navigation map changes with the travelling direction of the target vehicle. For example, when the target vehicle travels toward the west, the top of the navigation map is toward the west, and when the target vehicle travels toward the east, the top of the navigation map is toward the east. Accordingly, when referring to the navigation map, the driver only needs to determine, through left and right, which direction to turn, so that the driver can control the travelling direction of the vehicle. The north-up means that an orientation of the navigation map always maintains the top as north, which is fixed, and does not change with travelling of the target vehicle. The driver mainly determines a direction to turn through a direction or through adjusting a navigation device to be in a north direction. Accordingly, the north-up is suitable for a user with a good sense of direction, and allows the user to control the travelling direction of the vehicle at any time. This embodiment of this application is mainly applicable to a navigation mode in which the navigation orientation is the heading-up.

In actual application, a road condition displayed in the navigation interface may be stereoscopic, and the navigation interface is a navigation interface of a three-dimensional electronic navigation map. Certainly, a road condition displayed in the navigation interface may also be planar, and the navigation interface is a navigation interface of a two-dimensional electronic navigation map. The driver or the user may perform selection or switching according to actual requirements.

Specifically, the user starts, through the terminal, the application program supporting the vehicle navigation, to display the navigation interface in the navigation application to navigate the target vehicle; and display a virtual vehicle representing the target vehicle in the navigation interface, where the virtual vehicle moves in the navigation map as the target vehicle travels.

Operation S306: Display, between a moment when the virtual vehicle moves to a target distance from a curve and a moment when the virtual vehicle enters the curve, that moments when both the navigation map and a front of vehicle direction of the virtual vehicle deviate a plurality of times in a direction opposite to the curve exist, deviation degrees of the plurality of deviations gradually increasing in time sequence.

The curve is a road section on a road with a non-zero road curvature. The curve may be an intersection at which turning or turning around is required, a fork, a loop road, or the like. In addition, a navigation route for navigating the target vehicle may further include a straight road.

The direction opposite to the curve is related to a direction in which the target vehicle travels into the curve, or related to a direction in which the target vehicle travels out of the curve. In a process in which the target vehicle travels into the curve, the direction opposite to the curve is a direction opposite to the direction in which the target vehicle travels into the curve. For example, the direction in which the target vehicle travels into the curve are rightward, and the direction opposite to the curve is leftward. In a process in which the target vehicle travels out of the curve, the direction opposite to the curve is a direction opposite to the direction in which the target vehicle travels out of the curve. For example, the direction in which the target vehicle travels out of the curve is leftward, and the direction opposite to the curve is a right direction.

The front of vehicle direction of the virtual vehicle is a direction indicated by the front of vehicle of the virtual vehicle. In a navigation map in which the navigation orientation is heading-up, the front of vehicle direction of the virtual vehicle always maintains the heading-up direction. However, in this embodiment, before the target vehicle travels into the curve and when a distance between the virtual vehicle and the curve is the target distance, the navigation map and the front of vehicle direction of the virtual vehicle are displayed in the navigation interface, where the front of vehicle direction no longer remains unchanged, but starts to deviate in the direction opposite to the curve until the virtual vehicle moves into the curve. During navigation of the target vehicle, a front of vehicle direction of the target vehicle during actual travelling is controlled by the driver or an autonomous driving system, and is not directly associated with the front of vehicle direction of the virtual vehicle.

A deviation degree of the front of vehicle direction may be determined based on a magnitude of an angle at which the front of vehicle direction deviates from the heading-up direction. A larger angle at which the front of vehicle direction deviates from the heading-up direction indicates a larger deviation degree of the front of vehicle direction.

For the navigation map, the deviation means rotation of the navigation map. A deviation degree of the navigation map is configured for representing a rotation degree of the navigation map. The rotation degree of the navigation map may be consistent with the deviation degree of the front of vehicle direction. For example, if the deviation degree of the front of vehicle direction is 30°, the rotation degree of the navigation map is also 30°.

If the front of vehicle direction of the virtual vehicle deviates, the navigation map deviates following the front of vehicle direction of the virtual vehicle, and deviation amounts may be consistent. For example, if the front of vehicle direction of the virtual vehicle deviates at a constant speed according to a preset speed, when the navigation map deviates following the front of vehicle direction of the virtual vehicle, the navigation map also deviates at the constant speed according to the preset speed. For another example, if the front of vehicle direction of the virtual vehicle deviates at a constant acceleration according to a preset acceleration, when the navigation map deviates following the front of vehicle direction of the virtual vehicle, the navigation map also deviates at the constant acceleration according to the preset acceleration.

The target distance may be a set distance. When the virtual vehicle moves to the target distance from the curve, a deviation in the direction opposite to the curve starts to be improved, which aims to overcome a problem of dramatic rotation of the navigation map when moving into the curve when a change amplitude of the deviation degree of the navigation maps before and after the virtual vehicle moves into the curve is small.

Further, based on overcoming the dramatic rotation of the navigation map, a consecutive factor may further be introduced to set the target distance. In this case, the target distance may be a distance enabling the deviation degree after the virtual vehicle moves into the curve to be consecutive with the deviation degree before the virtual vehicle moves into the curve. That the deviation degree after the virtual vehicle moves into the curve is consecutive with the deviation degree before the virtual vehicle moves into the curve may mean that, during a time period between before the virtual vehicle moves into the curve and after the virtual vehicle moves into the curve, changes in the front of vehicle direction of the virtual vehicle deviating from the heading-up direction each is an even deviation, for example, a constant speed deviation or a constant acceleration deviation.

A moment when the virtual vehicle moves to the target distance from entering the curve is denoted as t−n, and a moment when the virtual vehicle enters the curve is denoted as t. When the virtual vehicle moves to the target distance from the curve at the moment t−n, the navigation map and the front of vehicle direction of the virtual vehicle start to deviate in the direction opposite to the curve. In a process in which the virtual vehicle continues to move toward the curve, from the moment t−n to the moment t, the navigation map and the front of vehicle direction of the virtual vehicle continue to deviate, and the deviation degree of the front of vehicle direction gradually increases in time sequence. For example, at the moment t−n, the deviation degree of the front of vehicle direction is 5°; at a moment t−n+5, the deviation degree of the front of vehicle direction is 10'; and at a moment t−n+10, the deviation degree of the front of vehicle direction is 15°. Similarly, because the deviation degree of the navigation map is consistent with the deviation degree of the front of vehicle direction, the deviation degree of the navigation map also gradually increases in time sequence.

The deviation degree after the virtual vehicle moves into the curve is consecutive with the deviation degree before the virtual vehicle moves into the curve, which may be indicated by a deviation angle change amount. In other words, a deviation angle change amount from after the virtual vehicle moves into the curve to when the virtual vehicle moves into the curve is consecutive with a deviation angle change amount from when the virtual vehicle moves into the curve to before the virtual vehicle moves into the curve. For example, it is assumed that the moment t is the moment when the virtual vehicle moves into the curve, a moment t−1 is a moment before the virtual vehicle moves into the curve, and a moment t+1 is a moment after the virtual vehicle moves into the curve. In this case, a deviation angle change amount from the moment t−1 to the moment t and a deviation angle change amount from the moment t to the moment t+1 are even. The deviation angle is an angle at which the front of vehicle direction of the virtual vehicle deviates from the heading-up direction at a specific moment, and may be denoted as $\alpha$. The deviation angle change amount from the moment t−1 to the moment t and the deviation angle change amount from the moment t to the moment t+1 are even, which is specifically expressed as follows: The deviation angle change amount from the moment t−1 to the moment t may be the same as the deviation angle change amount from the moment t to the moment t+1, for example, both are 2°; and the deviation angle change amount from the moment t−1 to the moment t and the deviation angle change amount from the moment t to the moment t+1 may become evenly larger, for example, the deviation angle change amount from the moment t to the moment t+1 is 2°, and a deviation angle change amount from the moment t+1 to a moment t+2 is 2.5°. It may be determined that after the virtual vehicle moves into the curve, the deviation angle change amount evenly increases by 0.5°. Therefore, it may be determined that the deviation angle change amount from the moment t−1 to the moment t is 2°−0.5°=1.5°.

In the foregoing navigation method, during navigation of a target vehicle, a corresponding navigation interface is displayed, and a navigation map and a virtual vehicle that moves in the navigation map as the target vehicle travels are displayed in the navigation interface; when the virtual vehicle moves to a target distance from a curve, the navigation map and a front of vehicle direction of the virtual vehicle no longer maintain the same direction, for example, maintain heading-up orientation, but start to deviate in an direction opposite to the curve; and between a moment when the virtual vehicle moves to the target distance from the curve and a moment when the virtual vehicle enters the curve, moments when both the navigation map and the front of vehicle direction of the virtual vehicle deviate in the direction opposite to the curve exist, deviation degrees of the plurality of deviations gradually increasing in time sequence. Accordingly, after the virtual vehicle moves into the curve, the navigation map and the front of vehicle direction of the virtual vehicle do not change dramatically due to a dramatic increase in a road curvature, and the navigation map does not rotate dramatically, which reduces consumption of resources for reading map data in a short time, and does not cause dizziness to a user, thereby improving user experience.

In one embodiment, the displaying, between a moment when the virtual vehicle moves to a target distance from a curve and a moment when the virtual vehicle enters the curve, that moments when both the navigation map and a front of vehicle direction of the virtual vehicle deviate a plurality of times in a direction opposite to the curve exist, deviation degrees of the plurality of deviations gradually increasing in time sequence includes: displaying, at the moment when the virtual vehicle moves to the target distance from the curve, that the navigation map and the front of vehicle direction of the virtual vehicle start to deviate in the direction opposite to the curve; and displaying, between the moment when the virtual vehicle moves to the target distance from the curve and the moment when the virtual vehicle enters the curve, that the navigation map and the front of vehicle direction of the virtual vehicle continue to deviate the plurality of times in the direction opposite to the curve, where the deviation degrees of the plurality of deviations evenly increase in time sequence.

The even increase may be a constant speed increase or a constant acceleration increase.

Specifically, the virtual vehicle moves toward the curve, and when the distance between the virtual vehicle and the curve is the target distance, the navigation map and the front of vehicle direction of the virtual vehicle start to deviate in the direction opposite to the curve; and the virtual vehicle continues to move toward the curve, and before the virtual vehicle enters the curve, the navigation map and the front of vehicle direction of the virtual vehicle continue to deviate the plurality of times in the direction opposite to the curve. In a process of the plurality of deviations, the deviation degree of the front of vehicle direction and the deviation degree of the navigation map evenly increase in time sequence.

In the foregoing embodiment, when the distance between the virtual vehicle and the curve is the target distance, the navigation map and the front of vehicle direction of the virtual vehicle start to deviate, and when the virtual vehicle continues to move toward the curve, the navigation map and the front of vehicle direction of the virtual vehicle continue to deviate, where the deviation degrees increase evenly, thereby improving deviation stability of the navigation map and reducing dizziness of the user.

In one embodiment, that the deviation degrees of the plurality of deviations evenly increase in time sequence includes: In a case that the deviation degrees of the plurality of deviations increase at a constant speed in time sequence, in the moments when both the navigation map and the front of vehicle direction of the virtual vehicle deviate the plurality of times in the direction opposite to the curve, deviation angle change amounts between any adjacent moments are the same.

The constant speed deviation mainly means that after the front of vehicle direction of the virtual vehicle starts to deviate from the heading-up direction, a deviation speed remains unchanged. Since the navigation map rotates following the deviation of the front of vehicle direction, a rotation speed of the navigation map also remains unchanged.

In a process in which the front of vehicle direction of the virtual vehicle starts to deviate from the heading-up direction, the navigation map rotates following the deviation of the front of vehicle direction, where the deviation speed of the front of vehicle direction is consistent with the rotation speed of the navigation map, and in a constant speed deviation scenario, the deviation speed of the front of vehicle direction remains unchanged, so that the deviation angle change amounts between any adjacent moments are the same. For example, a deviation angle change amount from a moment t−n to a moment t−n+5 is the same as a deviation angle change amount from the moment t−n+5 to a moment t−n+10, for example, both are 5°.

In the foregoing embodiment, before the virtual vehicle moves into the curve and when the distance between the virtual vehicle and the curve is the target distance, the navigation map and the front of vehicle direction of the virtual vehicle no longer maintain the same direction, for example, maintain the heading-up orientation, but start to deviate at a constant speed in the direction opposite to the curve until the virtual vehicle moves into the curve, thereby avoiding dramatic rotation of the navigation map and reducing consumption of resources for reading the map data in a short time.

In one embodiment, when the deviation is a constant speed deviation, calculating the target distance according to a current travelling speed, an deviation angle when the virtual vehicle moves into the curve, and a deviation angle change amount includes: calculating, by using the deviation angle change amount as a constant speed deviation change amount, first time required for which the constant speed deviation is performed from heading-up direction to the deviation angle when the virtual vehicle moves into the curve; and calculating the target distance according to the current travelling speed and the first time.

The deviation angle change amount used as a constant speed deviation change amount is a unit change amount of the deviation angle of the front of vehicle direction in the curve starting from the deviation angle of the front of vehicle direction when the virtual vehicle moves into the curve. For example, by using the moment t as a moment when the virtual vehicle moves into the curve, at the moment t, a deviation angle of the front of vehicle direction of the virtual vehicle from the heading-up direction is $\alpha t$. The virtual vehicle continues to move in the curve, and at a moment t+n, the virtual vehicle is in the curve and the deviation angle of the front of vehicle direction of the virtual vehicle from the heading-up direction is $\alpha_{t+n}$. Therefore, the constant speed deviation change amount is $(\alpha_{t+n}-\alpha_t)/n$. In one embodiment, n may be 1, that is, the constant speed deviation change amount is $\alpha_{t+1}-\alpha_t$.

When the front of vehicle direction of the virtual vehicle is the heading-up direction, the deviation angle is 0, and the deviation angle of the front of vehicle direction when the virtual vehicle moves to the curve is denoted as $\alpha_t$. If the constant speed deviation change amount is $\alpha_{t+1}-\alpha_t$, according to the constant speed deviation change amount, it can be found that time required for the deviation angle to change from a constant speed 0 to $\alpha_t$ is $(\alpha_t-0)/(\alpha_{t+1}-\alpha_t)$. The $(\alpha_t-0)/(\alpha_{t+1}-\alpha_t)$ is used as the first time, and the target distance is obtained according to the current travelling speed of the target vehicle and the first time. For example, assuming that the target distance is denoted as s and the current travelling speed of the target vehicle is denoted as v, $s=v\times(\alpha_t-0)/(\alpha_{t+1}-\alpha_t)$.

After the target distance is obtained, when the distance between the virtual vehicle and the curve is the target distance, the front of vehicle direction of the virtual vehicle starts to deviate at the constant speed according to the constant speed deviation change amount $\alpha_{t+1}-\alpha_t$. During the constant speed deviation of the front of vehicle direction of the virtual vehicle, the navigation map rotates at the constant speed following the constant speed deviation of the front of vehicle direction. When the virtual vehicle moves by the target distance, the virtual vehicle exactly enters the curve. In this case, based on the constant speed deviation, the deviation angle between the front of vehicle direction of the virtual vehicle when the virtual vehicle enters the curve and the heading-up direction is exactly $\alpha_t$.

For example, if the current travelling speed v of the target vehicle=60 km/h (17 m/s), $\alpha_t$=30°, and $\alpha_{t+1}$=32°, the constant speed deviation change amount is $\alpha_{t+1}-\alpha_t$=2°, and the target distance $s=v\times(\alpha_t-0)/(\alpha_{t+1}-\alpha_t)$=255 meters.

In the foregoing embodiment, the constant speed deviation change amount before the virtual vehicle enters the curve is the constant speed deviation change amount of the virtual vehicle in the curve. Therefore, the constant speed deviation change amount remains unchanged before and after the virtual vehicle moves into the curve, so that the front of vehicle directions before and after the virtual vehicle enters the curve are consecutive, and a display effect of the navigation map is more stable.

In one embodiment, that the deviation degrees of the plurality of deviations evenly increase in time sequence includes: In a case that the deviation degrees of the plurality of deviations increase at a constant acceleration in time sequence, in the moments when both the navigation map and the front of vehicle direction of the virtual vehicle deviate the plurality of times in the direction opposite to the curve, deviation angle change amounts between any adjacent moments increase at a constant speed.

The constant acceleration deviation mainly means that after the front of vehicle direction of the virtual vehicle starts to deviate from the heading-up direction, a deviation speed increases at a fixed acceleration. Since the navigation map rotates following the deviation of the front of vehicle direction, a rotation speed of the navigation map also increases at the fixed acceleration.

In a process in which the front of vehicle direction of the virtual vehicle starts to deviate from the heading-up direction, the navigation map rotates following the deviation of the front of vehicle direction, where the deviation speed of the front of vehicle direction is consistent with the rotation speed of the navigation map, and in a constant acceleration deviation scenario, the deviation speed of the front of vehicle direction increases at a fixed acceleration, so that the deviation angle change amounts between any adjacent moments increase at a constant speed. For example, the deviation angle change amount from the moment t−n to the moment t−n+5 is 1.5°, the deviation angle change amount from the moment t−n+5 to the moment t−n+10 is 2°, and the deviation angle change amount from the moment t−n+10 to a moment t−n+15 is 2.5°.

In the foregoing embodiment, before the virtual vehicle moves into the curve and when the distance between the virtual vehicle and the curve is the target distance, the navigation map and the front of vehicle direction of the virtual vehicle no longer maintain the same direction, for example, maintain the heading-up direction, but start to deviate at a constant acceleration in the direction opposite to the curve until the virtual vehicle moves into the curve, thereby avoiding dramatic rotation of the navigation map and reducing consumption of resources for reading the map data in a short time.

In one embodiment, after the virtual vehicle moves into the curve, the virtual vehicle sequentially passes through a first position point and a second position point in the curve.

When the deviation is a constant acceleration deviation, the obtaining the target distance through calculation according to a deviation angle and a current travelling speed of the target vehicle includes: determining a first deviation angle change amount of a front of vehicle angle of the virtual vehicle according to the deviation angle when the virtual vehicle moves into the curve and an estimated deviation angle when the virtual vehicle moves into the first position point; obtaining a second deviation angle change amount of the front of vehicle angle of the virtual vehicle according to the estimated deviation angle when the virtual vehicle moves into the first position point and an estimated deviation angle when the virtual vehicle moves into the second position point; obtaining a deviation acceleration of the front of vehicle angle of the virtual vehicle according to the first deviation angle change amount and the second deviation angle change amount; calculating, according to the deviation acceleration, second time required for which the constant acceleration deviation is performed from the heading-up direction to the deviation angle when the virtual vehicle moves into the curve; and calculating the target distance according to the current travelling speed and the second time.

The first position point may be a possible position point of the virtual vehicle at a next moment when the virtual vehicle moves into the curve. If an instance when the virtual vehicle moves into the curve is t, the next moment when the virtual vehicle moves into the curve is t+1, and the first position point is a possible position point of the virtual vehicle at the moment t+1.

The second position point may be a possible position point of the virtual vehicle at a next second moment when the virtual vehicle moves into the curve. If the moment when the virtual vehicle moves into the curve is t, the next second moment when the virtual vehicle moves into the curve is t+2, and the second position point is a possible position point of the virtual vehicle at the moment t+2.

The deviation angle when the virtual vehicle moves into the curve is estimated. An example is used in which the deviation angle when the virtual vehicle moves into the curve is denoted as $\alpha_t$, the estimated deviation angle when the virtual vehicle moves into the first position point is denoted as $\alpha_{t+1}$, and the estimated deviation angle when the virtual vehicle moves into the second position point is denoted as $\alpha_{t+2}$.

According to the deviation angle $\alpha_t$ when the virtual vehicle moves into the curve and the estimated deviation angle $\alpha_{t+1}$ when the virtual vehicle moves into the first position point, it is determined that the first deviation angle change amount of the front of vehicle angle of the virtual vehicle is $\alpha_{t+1}-\alpha_t$; and according to the estimated deviation angle $\alpha_{t+1}$ when the virtual vehicle moves into the first position point and the estimated deviation angle $\alpha_{t+2}$ when the virtual vehicle moves into the second position point, the second deviation angle change amount of the front of vehicle angle of the virtual vehicle is obtained as $\alpha_{t+2}-\alpha_{t+1}$. Since moments corresponding to $\alpha_t$, $\alpha_{t+1}$, and $\alpha_{t+2}$ are three adjacent moments, the deviation acceleration is $(\alpha t_{+2}-\alpha_{t+1})-(\alpha_{t+1}-\alpha_t)$.

When the front of vehicle direction of the virtual vehicle is the heading-up direction, the deviation angle is 0, and the deviation angle of the front of vehicle direction when the virtual vehicle moves to the curve is denoted as $\alpha_t$. If the deviation acceleration is $(\alpha_{t+2}-\alpha_{t+1})-(\alpha_{t+1}-\alpha_t)$, according to the deviation acceleration, it can be found that time required for the deviation angle to change at a constant acceleration from 0 to $\alpha_t$ is $(\alpha_t-0)/[(\alpha_{t+2}-\alpha_{t+1})-(\alpha_{t+1}-\alpha_t)]$, and the $(\alpha_t-0)/[(\alpha_{t+2}-\alpha_{t+1})-(\alpha_{t+1}-\alpha_t)]$ is used as the second time. The target distance is obtained according to the current travelling speed of the target vehicle and the second time.

After the target distance is obtained, when the distance between the virtual vehicle and the curve is the target distance, the front of vehicle direction of the virtual vehicle starts to deviate at the constant acceleration according to the deviation acceleration $(\alpha_t-0)/[(\alpha_{t+2}-\alpha_{t+1})-(\alpha_{t+1}-\alpha_t)]$. During the constant acceleration deviation of the front of vehicle direction of the virtual vehicle, the navigation map rotates at the constant acceleration following the constant acceleration deviation of the front of vehicle direction. When the virtual vehicle moves by the target distance, the virtual vehicle exactly enters the curve. In this case, based on the constant acceleration deviation, the deviation angle between the front of vehicle direction of the virtual vehicle when the virtual vehicle enters the curve and the heading-up direction is exactly $\alpha_t$.

In the foregoing embodiment, the deviation acceleration before the virtual vehicle enters the curve is the deviation acceleration of the virtual vehicle in the curve. Therefore, the deviation acceleration remains unchanged before and after the virtual vehicle moves into the curve, so that the front of vehicle directions before and after the virtual vehicle enters the curve are consecutive, and a display effect of the navigation map is more stable.

In one embodiment, a navigation route of the target vehicle includes the curve, and the terminal may use a position point on the navigation route of the target vehicle at which a curvature changes from zero to non-zero as a curve starting point of the curve; obtain curvature circle center coordinates corresponding to the curve starting point; calculate, according to the curve starting point and the curvature circle center coordinates, a deviation angle between a tangent line at the curve starting point and a heading-up direction as a deviation angle when the virtual vehicle moves into the curve; and obtain the target distance through calculation according to the deviation angle and a current travelling speed of the target vehicle.

The navigation route is a route calculated according to a set navigation starting point and a set navigation ending point, to be specific, a series of roads are passed from the navigation starting point, to finally reach the navigation ending point. In this embodiment of this application, the navigation route may include lanes suggested for travelling on each road that needs to be passed through, or may not distinguish lanes. Certainly, lanes may be distinguished on some roads, and lanes are not distinguished on some roads.

Figure 4:
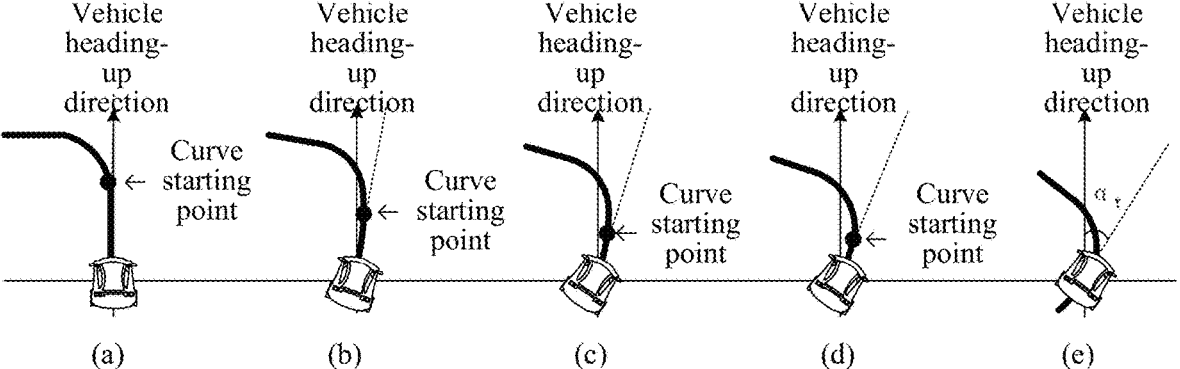
FIG. 4 is a schematic diagram in which a virtual vehicle moves on a straight road to a curve starting point according to an embodiment of the present disclosure.

The terminal may obtain coordinates of each position point on the navigation route and a curvature of each position point, to use the position point at which the curvature changes from persistent zero to non-zero as the curve starting point. FIG. 4 is a schematic diagram in which a virtual vehicle moves on a straight road to a curve starting point according to an embodiment. Referring to FIG. 4, the virtual vehicle moves on the straight road toward the curve. Since the direction in which the virtual vehicle enters the curve is leftward, the direction opposite to the curve is rightward. As shown in part (a) of FIG. 4, when the distance between the virtual vehicle and the curve is greater than the target distance, the front of vehicle direction of the virtual vehicle is the heading-up direction. In a process in which the virtual vehicle continues to move toward the curve, when the distance between the virtual vehicle and the curve is the target distance, as shown in part (b) to part (e) of FIG. 4, the front of vehicle direction of the virtual vehicle starts to deviate rightward, and the deviation is an even deviation until the virtual vehicle moves to the curve starting point, where the curve starting point is a position point at which the curvature starts to be non-zero; and the deviation angle between the front of vehicle direction when the virtual vehicle is located at the curve starting point and the heading-up direction is denoted as $\alpha t$. The terminal may use a position point on the navigation route at which the curvature changes from non-zero to persistent zero as the curve ending point, that is, the position point at which the virtual vehicle moves out of the curve.

In this embodiment of this application, the navigation map is known data. The road data of the navigation map includes route curvature data. The route curvature data includes coordinates of each position point on roads, and a curvature, a curvature radius, and curvature circle center coordinates that correspond to each position point. During travelling of the target vehicle, the terminal correspondingly moves the virtual vehicle in the navigation map according to a real-time position of the target vehicle. A road curvature of the straight road is zero. When the curvature of a position to which the virtual vehicle moves changes from zero to non-zero, it indicates that the virtual vehicle moves into a curve. When the virtual vehicle moves into the curve, there is an initial deviation angle, and the terminal displays that the virtual vehicle moves into the curve at the initial deviation angle.

Figure 5:
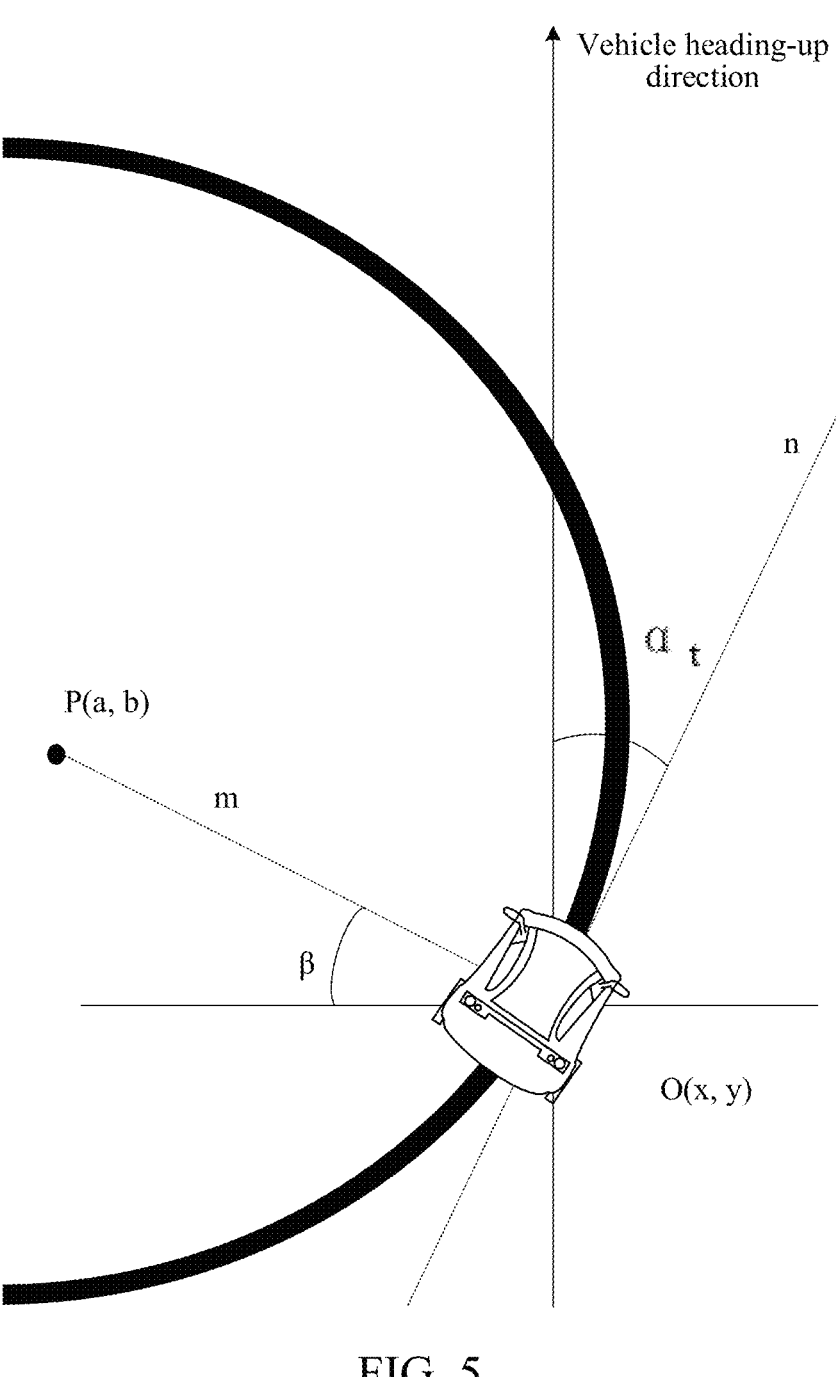
FIG. 5 is a schematic diagram of deriving a deviation angle of a virtual vehicle at a curve starting point according to an embodiment of the present disclosure.

FIG. 5 is a schematic diagram of deriving a deviation angle of a virtual vehicle at a curve starting point according to an embodiment. Referring to FIG. 5, assuming that the position point at which the virtual vehicle moves into the curve (that is, the curve starting point) is O (x, y), that is, coordinates of the vehicle are O (x, y), curvature circle center coordinates of a curvature circle corresponding to O (x, y) obtained according to the route curvature data are P (a, b), and a curvature radius of the curvature circle is R (a distance between a point P and a point O), $(x-a)^2+(y-b)^2=R^2$, and a curvature radius is 1/R. A normal line of the position point at which the vehicle is located is m, the front of vehicle direction of the virtual vehicle is a direction in which a tangent line of the vehicle position point on the curvature circle is located, the tangent line is n, a slope of the tangent line n is K, and the deviation angle between the front of vehicle direction when the virtual vehicle moves into the curve and the heading-up direction is denoted as $\alpha_t$, $\alpha_t=\beta$, and $1/K=(b-y)/(a-x)=\tan\alpha_t$. In this case, it is deduced that $\alpha_t=\arctan((b-y)/(a-x))$. After the deviation angle $\alpha_t$ when the virtual vehicle moves into the curve is obtained, the target distance is obtained according to the deviation angle $\alpha_t$ and the current travelling speed of the target vehicle.

The deviation angle $\alpha_t$ is related to the gen O (x, y) of the position point to which the virtual vehicle moves and the curvature circle center coordinates P (a, b) of the curvature circle. The coordinates O (x, y) of the position point to which the virtual vehicle moves are related to the curvature circle center coordinates P (a, b) of the curvature circle and a curvature of the position point O (x, y) to which the virtual vehicle moves. The deviation angle $\alpha$ is related to the curvature. Based on the deviation angle related to the curvature, the target distance is determined, so that the deviation of the front of vehicle direction of the virtual vehicle before travelling into the curve can be better consecutive with the deviation in the curve.

In one embodiment, the obtaining the target distance through calculation according to the deviation angle and a current travelling speed of the target vehicle includes: estimating, according to the current travelling speed of the target vehicle and a curvature radius corresponding to the curve starting point, a trajectory deviation amount after the virtual vehicle moves into the curve; estimating, according to the trajectory deviation amount, a vehicle position after the virtual vehicle moves into the curve; calculating, according to the vehicle position and curvature circle center coordinates corresponding to the vehicle position, an estimated deviation angle after the virtual vehicle moves into the curve; determining a deviation angle change amount of a front of vehicle angle of the virtual vehicle according to the deviation angle when the virtual vehicle moves into the curve and the estimated deviation angle after the virtual vehicle moves into the curve; and calculating the target distance according to the current travelling speed, the deviation angle when the virtual vehicle moves into the curve, and the deviation angle change amount.

The deviation angle at each position point of the virtual vehicle in the curve is related to the coordinates of the vehicle position and the curvature circle center coordinates corresponding to the vehicle position. The terminal predicts, according to data at a previous moment, a position to which the virtual vehicle moves at a next moment, and then calculates, according to coordinates corresponding to the position to which the virtual vehicle moves at the next moment and curvature circle center coordinates corresponding to the position, a deviation angle corresponding to the position to which the virtual vehicle moves at the next moment.

Figure 6:
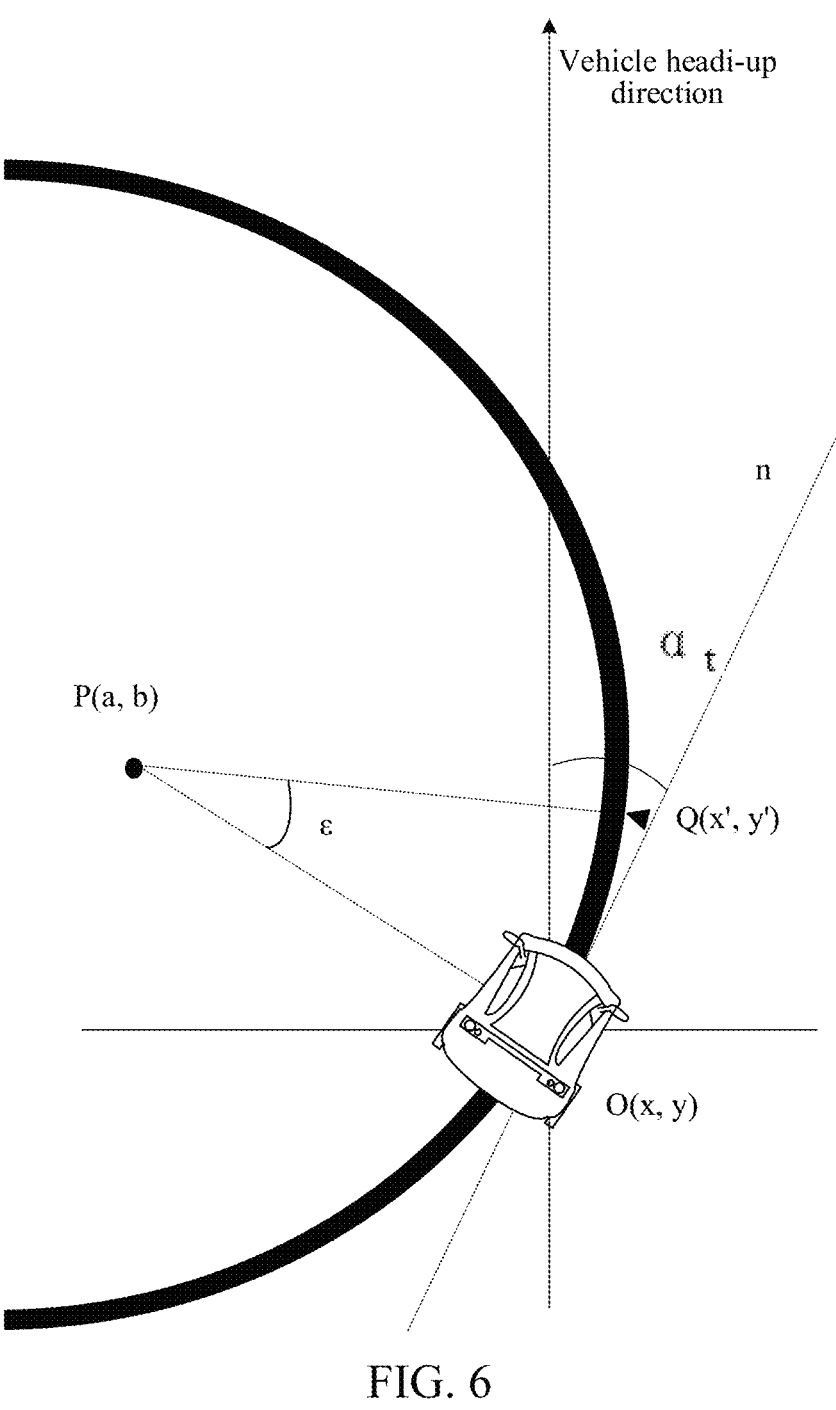
FIG. 6 is a schematic diagram of performing position estimation based on a trajectory deviation amount according to an embodiment of the present disclosure.

FIG. 6 is a schematic diagram of performing position estimation based on a trajectory deviation according to an embodiment. Referring to FIG. 6, a real-time calculation process of the deviation angle of the front of vehicle direction of the virtual vehicle may be deduced as follows: The current travelling speed of the target vehicle is denoted as v, the moment when the target vehicle travels into the curve is denoted as t, a next moment when the target vehicle travels into the curve is denoted as t+1, a time interval from a $t^{th}$ moment to a $(t+1)^{th}$ moment is denoted as $\Delta t$, a travelling arc length is denoted as L, a trajectory deviation amount is denoted as $\varepsilon$, and a curvature radius corresponding to a position of the target vehicle at the $t^{th}$ moment is denoted as R. When $\Delta t$ is smaller, a travelling trajectory of the target vehicle in the curve is closer to a circular arc. In this case, L=v*Δt, Δt=2πR*ε/(v*360°), and ε=180°*v*Δt/πR. Assuming that the time interval from $t^{th}$ moment to the $(t+1)^{th}$ moment is 1 second, that is, Δt=1, ε=180°*v/πR, that is, the trajectory deviation amount ε is only related to the current travelling speed v of the target vehicle, and the position Q (x', y') to which the virtual vehicle moves at the $(t+1)^{th}$ moment may be estimated according to the trajectory deviation amount ε.

Figure 7:
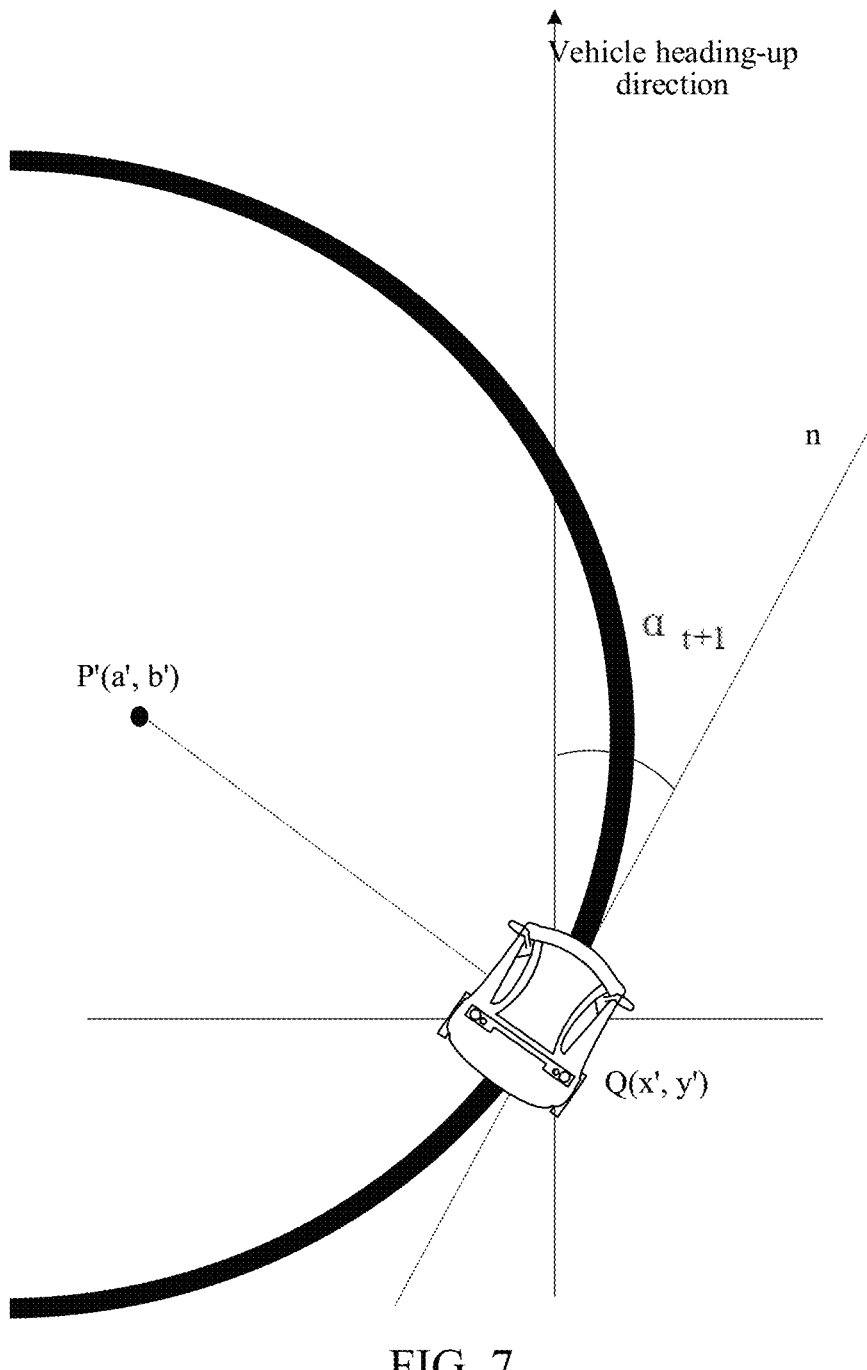
FIG. 7 is a schematic diagram in which a virtual vehicle moves into an estimated position according to an embodiment of the present disclosure.

FIG. 7 is a schematic diagram in which a virtual vehicle moves into an estimated position according to an embodiment. Referring to FIG. 7, after the position Q (x', y') to which the virtual vehicle moves at the moment t+1 is estimated, curvature circle center coordinates P' (a', b') corresponding to a curvature circle corresponding to Q (x', y') are obtained. In this case, the deviation angle of the virtual vehicle at the moment t+1 is $\alpha_{t+1}$=arc tan ((b'-y')/(a'-x')), that is, the estimated deviation angle after the virtual vehicle moves into the curve.

According to the deviation angle $\alpha_t$=arc tan ((b-y)/(a-x)) when the virtual vehicle moves into the curve and the estimated deviation angle $\alpha_{t+1}$=arc tan ((b'-y')/(a'-x')) after the virtual vehicle moves into the curve, it is determined that the deviation angle change amount of the front of vehicle angle of the virtual vehicle is $\alpha_{t+1}-\alpha_t$.

Next, in a scenario in which the even deviation is a constant speed deviation, according to the descriptions of the foregoing related embodiments, the target distance is calculated according to the current travelling speed of the target vehicle, the deviation angle $\alpha_t$ when the virtual vehicle moves into the curve, and the deviation angle change amount $\alpha_t-\alpha_{t+1}$. In a scenario in which the even deviation is a constant acceleration deviation, according to the foregoing related embodiment, the target distance is calculated according to the current travelling speed of the target vehicle, the deviation angle $\alpha_t$ when the virtual vehicle moves into the curve, and the deviation angle change amount $\alpha_t-\alpha_{t+1}$.

The deviation angle at each position point of the virtual vehicle in the curve is related to the coordinates of the vehicle position and the curvature circle center coordinates corresponding to the vehicle position, that is, the deviation angle of the virtual vehicle in the curve dynamically changes with the road curvature. In the foregoing embodiment, a relevant variant of the even deviation before entering the curve is determined based on the deviation angle dynamically changing with the road curvature, so that front of vehicle directions before and after the virtual vehicle enters the curve are consecutive, so that the display effect of the navigation map is more stable.

In one embodiment, in a scenario in which the even deviation is the constant acceleration deviation, it is assumed that the moment when the virtual vehicle moves into the curve is t, the next moment when the virtual vehicle moves into the curve is t+1, the first position point is a possible position point of the virtual vehicle at the moment t+1, and the estimated deviation angle when the virtual vehicle moves into the first position point is denoted as $\alpha_{t+1}$.

Operations of calculating the estimated deviation angle $\alpha_{t+1}$ when the virtual vehicle moves into the first position point include: estimating, according to the current travelling speed of the target vehicle and a corresponding curvature radius when the virtual vehicle moves into the curve, a trajectory deviation amount after the virtual vehicle moves into the first position point; estimating, according to the trajectory deviation amount, a vehicle position after the virtual vehicle moves into the first position point; and calculating, according to the vehicle position and curvature circle center coordinates corresponding to the vehicle position, an estimated deviation angle after the virtual vehicle moves into the first position point.

According to the trajectory deviation amount ε, the first position point to which the virtual vehicle moves at the $(t+1)^{th}$ moment is estimated as Q (x', y'), and the curvature circle center coordinates P' (a', b') corresponding to the curvature circle corresponding to Q (x', y') are obtained. In this case, the estimated deviation angle after the virtual vehicle moves into the first position point is $\alpha_{t+1}$=arc tan ((b'-y')/(a'-x')).

In one embodiment, in a scenario in which the even deviation is the constant speed deviation, it is assumed that the moment when the virtual vehicle moves into the curve is t, the next second moment when the virtual vehicle moves into the curve is t+2, the second position point is a possible position point of the virtual vehicle at the moment t+2, and the estimated deviation angle after the virtual vehicle moves into the second position point is denoted as $\alpha_{t+2}$.

Operations of calculating the estimated deviation angle $\alpha_{t+2}$ after the virtual vehicle moves into the second position point include: estimating, according to the current travelling speed of the target vehicle and the corresponding curvature radius when the virtual vehicle moves into the curve, a trajectory deviation amount after the virtual vehicle moves into the second position point; estimating, according to the trajectory deviation amount, a vehicle position after the virtual vehicle moves into the second position point; and calculating, according to the vehicle position and curvature circle center coordinates corresponding to the vehicle position, the estimated deviation angle after the virtual vehicle moves into the second position point.

According to the current travelling speed of the target vehicle and the corresponding curvature radius when the virtual vehicle moves into the curve, a trajectory deviation amount ε is estimated. According to the first position point Q (x', y') to which the virtual vehicle moves and the trajectory deviation amount ε, a first position point to which the virtual vehicle moves at the $(t+1)^{th}$ moment is estimated as Q (x", y"), and curvature circle center coordinates P" (a", b") corresponding to a curvature circle corresponding to Q (x", y") are obtained. In this case, the estimated deviation angle after the virtual vehicle moves into the second position point is $\alpha_{t+2}$=arc tan ((b"-y")/(a"-x")).

In one embodiment, the navigation method may further include: obtaining a real-time position of the target vehicle; displaying, in the navigation interface, a navigation map matching the real-time position; and obtaining route curvature data of a navigation route in the navigation map, the route curvature data including a curvature, a curvature radius, and curvature circle center coordinates that correspond to each position point on the navigation route in the navigation map.

In this embodiment, the navigation interface displays the navigation map matching the real-time position to which the target vehicle travels. The terminal may obtain a section of route curvature data at the real-time position on the navigation route. The route curvature data can reflect a form of a road, and may include data such as coordinates of each position point on the navigation route, and a curvature, a curvature radius, and curvature circle center coordinates that correspond to each position point. Accordingly, real-time positioning information of the target vehicle may be mapped to each position point on the navigation route, to determine a position point to which the virtual vehicle moves and route curvature data corresponding to a position point, which may be used to calculate a deviation angle in a next second.

In one embodiment, the obtaining a real-time position of the target vehicle includes: obtaining real-time data acquired by a sensor arranged on the target vehicle, the sensor including at least one of a camera or a radar; and performing, based on the real-time data acquired by the sensor, positioning and calibration on the target vehicle to obtain the real-time position of the target vehicle.

The real-time data acquired by the sensor arranged on the target vehicle may be transmitted to a server through an in-vehicle terminal. The server performs positioning and calibration on the target vehicle according to the acquired real-time data to obtain the real-time position of the target vehicle. The server may alternatively deliver the acquired real-time data to the terminal, and the terminal performs positioning and calibration on the target vehicle to obtain the real-time position of the target vehicle.

The sensors arranged on the target vehicle may include a radar, a lidar, a camera, and the like. Real-time image data acquired by the sensors may be configured for calibrating the real-time position of the target vehicle. The calibrated real-time position may be configured for determining a display position of the virtual vehicle in the navigation map.

In one embodiment, the obtaining route curvature data of a navigation route in the navigation map includes: obtaining a preset distance; and obtaining, based on the real-time position of the target vehicle, route curvature data in the preset distance ahead of the real-time position on the navigation route in the navigation map.

The preset distance may be, for example, 2 kilometers. Specifically, after the real-time position of the target vehicle is determined, the server may obtain route curvature data in a range of 2 kilometers ahead of the real-time position in the navigation map, and determine, based on the route curvature data, whether there is a curve in the range ahead of 2 kilometers. If there is a curve, a curve starting point is determined based on a curvature corresponding to each position point, and a deviation angle corresponding to the curve starting point is obtained. Assuming that a moment when the virtual vehicle moves to the curve starting point is t, a position point at which the virtual vehicle is located at a moment t+1 is estimated, and a deviation angle change amount is obtained based on a deviation angle at the position point at which the virtual vehicle is located at the moment t+1 and a deviation angle at the curve starting point. The target distance is calculated based on the deviation angle change amount. After the target distance is obtained, when a distance between the virtual vehicle and the curve is the target distance, the navigation map and the front of vehicle direction of the virtual vehicle start to evenly deviate in the direction opposite to the curve until the virtual vehicle moves into the curve.

FIG. 8 is a time sequence diagram of computing device interaction according to an embodiment. Referring to FIG. 8, the in-vehicle terminal on the target vehicle may transmit, in real time, images returned by the sensor such as the camera, the radar, or the lidar to the server. The server performs positioning and calibration according to the real-time data acquired by the sensor, to obtain the real-time position of the target terminal. The server obtains, from a map database according to the real-time position, route curvature data of a navigation route in the range of 2 kilometers ahead of the real-time position. Then, the server determines, according to the route curvature data, a point whose curvature is non-zero in the ahead 2 kilometers as the curve starting point, and calculates the deviation angle corresponding to the curve starting point, to obtain the target distance. When the distance between the virtual vehicle and the curve is the target distance, the navigation map and the front of vehicle direction of the virtual vehicle start to evenly deviate in the direction opposite to the curve until the virtual vehicle moves into the curve.

In one embodiment, the navigation method further includes: before the virtual vehicle moves into the curve and when the distance between the virtual vehicle and the curve is greater than the target distance, displaying, in the navigation interface, that the virtual vehicle moves in the navigation map in a heading-up direction.

To be specific, when the distance between the virtual vehicle and the curve before the virtual vehicle is about to enter the curve exceeds the target distance, the virtual vehicle travels on a straight road, and the virtual vehicle maintains the front of vehicle direction as the heading-up direction, so that the vehicle can be efficiently and conveniently guided to travel through left and right.

In one embodiment, the target distance is a first target distance; and the navigation method further includes: after the virtual vehicle moves out of the curve, displaying, in the navigation interface, that the navigation map and the virtual vehicle start to evenly approach a heading-up direction until the navigation map and the virtual vehicle are in the heading-up direction when a distance from the curve that the virtual vehicle moves to is a second target distance.

The target distance calculated before the virtual vehicle moves into the curve is referred to as the first target distance, and the target distance calculated after the virtual vehicle moves out of the curve is referred to as the second target distance. The method of calculating the second target distance is the same as that of calculating the first target distance, and details are not described herein again.

After the virtual vehicle moves out of the curve, rather than directly converting the front of vehicle direction of the virtual vehicle into the heading-up direction, deviation is performed gradually and evenly. Accordingly, when the front of vehicle angle evenly starts to approach and deviate toward the original heading-up direction, to exactly the heading-up direction, the deviation ends, and the virtual vehicle maintains to continuously move in the navigation route in the heading-up direction, which can avoid dramatic rotation of the map when the virtual vehicle moves out of the curve.

In one embodiment, the navigation method further includes: after the virtual vehicle moves out of the curve and when the distance between the virtual vehicle and the curve is greater than the second target distance, displaying, in the navigation interface, that the virtual vehicle moves in the navigation map in the heading-up direction.

To be specific, when the distance between the virtual vehicle and the curve before the virtual vehicle moves out of the curve is greater than the second target distance, the front of vehicle direction of the virtual vehicle is the heading-up direction. In this case, the even deviation can be stopped, and the front of vehicle direction of the virtual vehicle maintains the heading-up direction, so that the vehicle can be efficiently and conveniently guided to travel through left and right.

FIG. 9 is a schematic diagram in which before a curve is entered, a front of vehicle angle and a navigation map rotate evenly in a direction opposite to the curve until the curve is entered according to an embodiment. Referring to FIG. 9, a curve direction is rightward, and the front of vehicle angle slightly deviates leftward.

Figure 10:
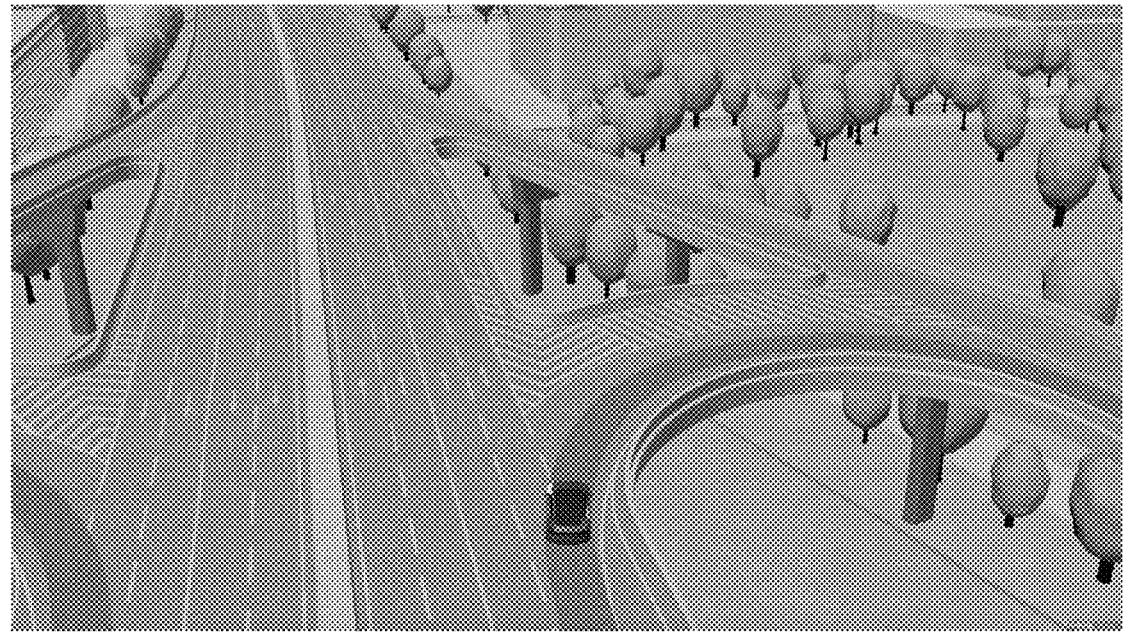
FIG. 10 is a schematic diagram of an interface in which a heading-up direction is always maintained in a curve in the related art of the present disclosure.

FIG. 10 is a schematic diagram of an interface in which a front of vehicle always maintains heading-up orientation in a curve in the related art. It can be seen that the front of vehicle direction always maintains the heading-up direction.

In one embodiment, after the virtual vehicle moves into the curve, during movement in the curve, the navigation map and the front of vehicle direction of the virtual vehicle dynamically deviate following a curvature degree of a position to which the virtual vehicle moves until the virtual vehicle moves out of the curve, so that when the target vehicle travels in the curve, more road environments about the curve ahead may be displayed in the navigation interface, and over-the-sight information that cannot be originally displayed is presented in the navigation interface, to increase driver prediction and guidance on a road ahead, thereby improving the vehicle navigation effect.

Specifically, during movement of the virtual vehicle in the curve, that the navigation map and the front of vehicle direction of the virtual vehicle dynamically deviate following the curvature degree of the position to which the virtual vehicle moves until the virtual vehicle moves out of the curve is displayed in the navigation interface.

The curve may be a road section on a road with a non-zero road curvature. The curve may be an intersection at which turning or turning around is required, a fork, a loop road, or the like. In addition, a navigation route for navigating the target vehicle may further include a straight road. During movement in the curve, the position to which the virtual vehicle moves is a position point in the curve, and the curvature degree of the position to which the virtual vehicle moves may be represented by a curvature of the curve at the corresponding position point. A larger curvature indicates a higher curvature degree, and a smaller curvature indicates a lower curvature degree. A specific representation of the dynamic deviation following the curvature degree of the position to which the virtual vehicle moves is that a deviation angle at the position to which the virtual vehicle moves is related to a curvature of the position to which the virtual vehicle moves.

In a navigation map in which the navigation orientation is heading-up, the front of vehicle direction of the virtual vehicle always maintains heading-up. In this embodiment, when the target vehicle travels in the curve of the road, the navigation map and the front of vehicle direction of the virtual vehicle are displayed in the navigation interface, and the front of vehicle direction no longer always remains unchanged, but dynamically deviates from the original heading-up direction following the curvature degree of the position to which the virtual vehicle moves until the virtual vehicle moves out of the curve. During navigation of the target vehicle, the front of vehicle direction of the target vehicle during actual travelling is controlled by the driver or an autonomous driving system, and is not directly associated with the dynamic deviation of the front of vehicle direction of the virtual vehicle.

In the foregoing embodiment, during navigation of the target vehicle, the navigation interface for navigating the target vehicle is displayed. The navigation interface includes the virtual vehicle that represents the target vehicle and that moves with the target vehicle travelling on the road. When the virtual vehicle moves into the curve on the navigation route as the target vehicle travels, the navigation map and the front of vehicle direction of the virtual vehicle no longer maintain the same direction, for example, maintain heading-up direction, but dynamically deviate following the curvature degree of the position to which the virtual vehicle moves until the virtual vehicle moves out of the curve, so that when the target vehicle travels in the curve, more road environments about the curve ahead are displayed in the navigation interface, to increase the driver prediction and guidance on the road ahead, thereby improving the vehicle navigation effect.

In one embodiment, the navigation method further includes: displaying, in the navigation interface, content about an over-the-sight distance ahead of the curve in a process in which the navigation map and the front of vehicle direction of the virtual vehicle dynamically deviate following the curvature degree of the position to which the virtual vehicle moves.

The content about the over-the-sight distance ahead of the curve is information about the front of the curve that cannot be displayed in the navigation interface and that falls outside a sight range of the driver. Such information about the over-the-sight-distance is displayed in advance in the navigation interface due to the deviation of the front of vehicle angle, to assist the driver in predicting the road. The information about the over-the-sight distance ahead of the curve may include a direction, a shape, a quantity of lanes, and the like of the curve, and may further include other road environments near the curve, such as a green plant, a building, and an identifier.

In one embodiment, the navigation orientation of the navigation interface is heading-up; and that during movement of the virtual vehicle in the curve, that the navigation map and the front of vehicle direction of the virtual vehicle dynamically deviate following the curvature degree of the position to which the virtual vehicle moves is displayed in the navigation interface includes: during movement of the virtual vehicle in the curve, displaying, in the navigation interface, that the navigation map and the front of vehicle direction of the virtual vehicle dynamically deviate from the heading-up direction following the curvature degree of the position to which the virtual vehicle moves.

This embodiment of this application is mainly applied to a navigation interface in which the navigation orientation is heading-up. The heading-up direction is a direction directly above the navigation interface. The objective of the dynamic deviation from the heading-up direction is to display more over-the-sight content in the navigation interface. A direction the dynamic deviation from the heading-up direction is a direction opposite to a curvature direction of the curve. To display more over-the-sight content about the curve, when the curvature of the position to which the virtual vehicle moves indicates that the curve curves rightward, the terminal displays that the front of vehicle direction of the virtual vehicle and the navigation map dynamically curve leftward, to deviate from the heading-up direction. When the curvature of the position to which the virtual vehicle moves indicates that the curve curves leftward, the terminal displays that the front of vehicle direction of the virtual vehicle and the navigation map dynamically curve rightward, to deviate from the heading-up direction.

In one embodiment, the navigation orientation of the navigation interface is heading-up; and the navigation method further includes: during movement of the virtual vehicle in the navigation map, in response to the curvature of the position to which the virtual vehicle moves changing from zero to non-zero, displaying, in the navigation interface, that the virtual vehicle moves into the curve at an initial angle deviated from the heading-up direction.

In this embodiment of this application, the navigation map is known data. The road data of the navigation map includes route curvature data. The route curvature data includes coordinates of each position point on roads, and a curvature, a curvature radius, and curvature circle center coordinates that correspond to each position point. During travelling of the target vehicle, the terminal correspondingly moves the virtual vehicle in the navigation map according to a real-time position of the target vehicle. A road curvature of the straight road is zero. When the curvature of the position to which the virtual vehicle moves changes from zero to non-zero, it indicates that the virtual vehicle starts to move into the curve and is at the curve starting point. For a method of calculating a deviation angle $\alpha_t$ corresponding to the virtual vehicle at the curve starting point, refer to descriptions of other embodiments.

Further, that during movement of the virtual vehicle in the curve, that the navigation map and the front of vehicle direction of the virtual vehicle dynamically deviate following the curvature degree of the position to which the virtual vehicle moves is displayed in the navigation interface includes: after the virtual vehicle moves into the curve at the deviation angle $\alpha_t$ from the heading-up direction, during movement of the virtual vehicle in the curve, displaying that the navigation map and the front of vehicle direction of the virtual vehicle deviate, starting from the deviation angle $\alpha_t$, following the curvature degree of the position to which the virtual vehicle moves, to dynamically deviate from the heading-up direction.

According to the foregoing derivation, after the virtual vehicle moves into the curve as the target vehicle travels, starting from the deviation angle $\alpha_t$, the deviation may be performed according to a deviation angle at each position point following the curvature degree of the position to which the virtual vehicle moves, to dynamically deviate from the heading-up direction to pass through the curve.

In one embodiment, the navigation method further includes: estimating, starting from the virtual vehicle moving into the curve, a trajectory deviation amount between the virtual vehicle at a next moment and the virtual vehicle at a current moment according to a curvature radius and a travelling speed at a curve position point at which the vehicle is located at the current moment; estimating, according to the curve position point at which the virtual vehicle is located at the current moment and the trajectory deviation amount, a curve position point at which the virtual vehicle is located at the next moment; obtaining curvature circle center coordinates corresponding to the estimated curve position point at which the virtual vehicle is located at the next moment; and determining, according to the curve position point at the next moment and the curvature circle center coordinates corresponding to the curve position point at the next moment, a deviation angle at the curve position point at the next moment.

A deviation angle corresponding to each position point in the curve may be determined according to the position point and curvature circle center coordinates corresponding to the position point. Curvature circle center coordinates corresponding to each position point in the curve are different. Curvature circle center coordinates correspond to a specific point on a normal line of the curve at the position point O (x, y). A distance between the point and the position point O (x, y) is equal to a curvature radius R at the point. The curvature radius R is an inverse of a curvature k. The curvature k may be determined according to a first derivative and a second derivative of the curve at the position point O (x, y). Therefore, it can be seen that the deviation angle corresponding to each position point in the curve is related to the curvature.

It is assumed that the current travelling speed of the target vehicle is denoted as v1, the current moment of the target vehicle is the foregoing $(t+1)^{th}$ moment, and correspondingly, the next moment is the $(t+2)^{th}$ moment; and a time interval from the $(t+1)^{th}$ moment to the $(t+2)^{th}$ moment is denoted as $\Delta t$, a travelling arc length is denoted as L1, the trajectory deviation amount is denoted as $\epsilon 1$, and a curvature radius corresponding to a position at which the target vehicle is located at the $(t+1)^{th}$ moment is denoted as R1. When $\Delta t$ is smaller, a travelling trajectory of the target vehicle in the curve is closer to a circular arc. In this case, $L1=v1*\Delta t$; $\Delta t=2\pi R*\epsilon 1/(v*360°)$; and $\epsilon 1=180°*v1*t/\pi R1$. Since the time interval from the $(t+1)^{th}$ moment to the $(t+2)^{th}$ moment is 1 second, that is, $\Delta t=1$, $\epsilon 1=180°*v1/\pi R1$, that is, the trajectory deviation amount $\epsilon 1$ is only related to the current travelling speed v1 of the target vehicle, and the position to which the virtual vehicle moves at the $(t+2)^{th}$ moment may be estimated according to the trajectory deviation amount $\epsilon 1$. After the position to which the virtual vehicle moves at the $(t+2)^{th}$ moment is estimated, a deviation angle of the virtual vehicle at the $(t+2)^{th}$ moment may be determined according to curvature circle center coordinates corresponding to a curvature circle corresponding to the position.

In a specific embodiment, an embodiment of this application provides a navigation method that can be performed by a terminal. An even deviation in this embodiment is a constant speed deviation. The method includes the following operations:

obtaining real-time data acquired by a sensor arranged on a target vehicle, the sensor including at least one of a camera or a radar;

performing, based on the real-time data acquired by the sensor, positioning and calibration on the target vehicle to obtain a real-time position of the target vehicle;

displaying, in a navigation interface for navigating the target vehicle, a navigation map matching the real-time position and a virtual vehicle that moves as the target vehicle travels;

obtaining, based on the real-time position of the target vehicle, route curvature data in a preset distance ahead of the real-time position on a navigation route in the navigation map, the route curvature data including a curvature, a curvature radius, and curvature circle center coordinates that correspond to each position point on the navigation route in the navigation map;

when it is determined, according to the route curvature data, that there is a curve at the preset distance ahead, using a position point at which the curvature changes from zero to non-zero as a curve starting point of the curve;

calculating, according to the curve starting point and curvature circle center coordinates corresponding to the curve starting point, a deviation angle between a tangent line at the curve starting point and a heading-up direction as a deviation angle when the virtual vehicle moves into the curve;

estimating, according to a current travelling speed of the target vehicle and a curvature radius corresponding to the curve starting point, a trajectory deviation amount after the virtual vehicle moves into the curve;

estimating, according to the trajectory deviation amount, a vehicle position after the virtual vehicle moves into the curve;

calculating, according to the vehicle position after the virtual vehicle moves into the curve and curvature circle center coordinates corresponding to the vehicle position, an estimated deviation angle after the virtual vehicle moves into the curve;

determining a deviation angle change amount of a front of vehicle angle of the virtual vehicle according to the deviation angle when the virtual vehicle moves into the curve and the estimated deviation angle after the virtual vehicle moves into the curve;

calculating, by using the deviation angle change amount as a constant speed deviation change amount, first time required for which the constant speed deviation is performed from the heading-up direction to the deviation angle when the virtual vehicle moves into the curve;

calculating a first target distance according to the current travelling speed and the first time;

before the virtual vehicle moves into the curve and when a distance between the virtual vehicle and the curve is greater than the first target distance, displaying, in the navigation interface, that the virtual vehicle moves in the navigation map in a heading-up direction;

before the virtual vehicle moves into the curve and when the distance between the virtual vehicle and the curve is greater than the first target distance, displaying, in the navigation interface, that the navigation map and a front of vehicle direction of the virtual vehicle start to deviate from the heading-up direction and deviate at a constant speed in a direction opposite to the curve until the virtual vehicle moves into the curve;

after the virtual vehicle moves out of the curve, displaying that the navigation map and the virtual vehicle start to evenly approach the heading-up direction until the navigation map and the virtual vehicle are in the heading-up direction when a distance from the curve that the virtual vehicle moves to is a second target distance; and after the virtual vehicle moves out of the curve and when the distance between the virtual vehicle and the curve is greater than the second target distance, displaying, in the navigation interface, that the virtual vehicle moves in the navigation map in the heading-up direction.

In this embodiment, before the virtual vehicle enters the curve, starting from the first target distance before the curve, the front of vehicle direction evenly deviates in the direction opposite to the curve until the virtual vehicle moves into the curve, and a deviation angle before the virtual vehicle enters the curve is consecutive with a deviation angle when the virtual vehicle enters the curve, so that the navigation map evenly rotates gradually, which can avoid problems of dizziness of a driver and an increase in the costs of consumed resources required to read map data in a short time caused by dramatic rotation of the navigation map due to a dramatic increase in a curve curvature when the virtual vehicle enters the curve. In addition, when the virtual vehicle travels out of the curve, the front of vehicle direction starts to evenly deviate in the direction opposite to the curve until the virtual vehicle moves in the navigation map in the heading-up direction, which can avoid the problems of the dizziness of the driver and the increase in the costs of the consumed resources required to read the map data in a short time caused by the dramatic rotation of the map when the virtual vehicle moves out of the curve.

Operations in flowcharts involved in the foregoing embodiments are displayed in sequence based on indication of arrows, but the operations are not necessarily performed in sequence based on a sequence indicated by the arrows. Unless indicated clearly, the operations do not need to be performed in a strict sequence, and can be performed in another sequence. In addition, at least some operations in the flowcharts involved in the foregoing embodiments may include a plurality of operations or a plurality of stages, and these operations or stages are not necessarily performed at a same moment, but may be performed at different moments.

The operations or stages are not necessarily performed in sequence, but may be performed by turn or alternately with other operations or at least part of operations or stages in other operations.

Based on the same invention concept, an embodiment of this application further provides a navigation apparatus for implementing the foregoing navigation method. The implementation solution for solving the problem provided by the apparatus is similar to the implementation solution recorded in the foregoing method. Therefore, for the specific limitations in one or more embodiments of the navigation apparatus provided below, refer to the foregoing limitations for the navigation method, and the description is not repeated herein again.

Figure 11:
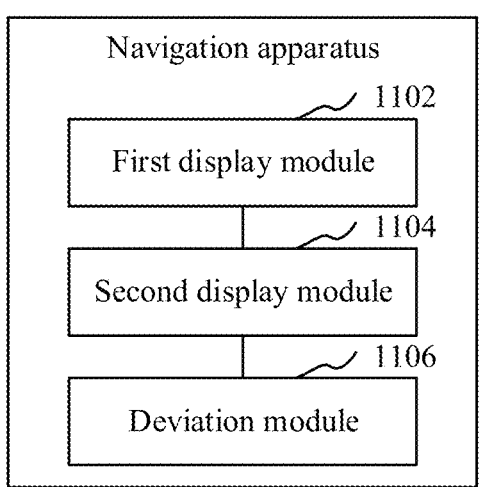
FIG. 11 is a structural block diagram of a navigation apparatus according to an embodiment of the present disclosure.

FIG. 11 is a structural block diagram of a navigation apparatus according to an embodiment. Referring to FIG. 11, the apparatus includes:

a first display module 1102, configured to display a navigation interface, the navigation interface being configured for navigating a target vehicle;

a second display module 1104, configured to display, in the navigation interface, a navigation map and a virtual vehicle that moves in the navigation map as the target vehicle travels; and the navigation map including a curve; and a deviation module 1106, configured to display, between a moment when the virtual vehicle moves to a target distance from a curve and a moment when the virtual vehicle enters the curve, that moments when both the navigation map and a front of vehicle direction of the virtual vehicle deviate a plurality of times in a direction opposite to the curve exist, deviation degrees of the plurality of deviations gradually increasing in time sequence.

In one embodiment, the deviation module 1106 is further configured to determine, at the moment when the virtual vehicle moves to the target distance from the curve, that the navigation map and the front of vehicle direction of the virtual vehicle start to deviate in the direction opposite to the curve; and display, between the moment when the virtual vehicle moves to the target distance from the curve and the moment when the virtual vehicle enters the curve, that the navigation map and the front of vehicle direction of the virtual vehicle continue to deviate the plurality of times in the direction opposite to the curve, where the deviation degrees of the plurality of deviations evenly increase in time sequence.

In one embodiment, the deviation module 1106 is further configured to display, in a case that the deviation degrees of the plurality of deviations increase at a constant speed in time sequence, in the moments when both the navigation map and the front of vehicle direction of the virtual vehicle deviate the plurality of times in the direction opposite to the curve, that deviation angle change amounts between any adjacent moments are the same.

In one embodiment, the deviation module 1106 is further configured to display, in a case that the deviation degrees of the plurality of deviations increase at a constant acceleration in time sequence, in the moments when both the navigation map and the front of vehicle direction of the virtual vehicle deviate the plurality of times in the direction opposite to the curve, that deviation angle change amounts between any adjacent moments increase at a constant speed.

In one embodiment, the apparatus further includes a third display module, configured to: before the virtual vehicle moves into the curve and when a distance between the virtual vehicle and the curve is greater than the target distance, display, in the navigation interface, that the virtual vehicle moves in the navigation map in a heading-up direction.

In one embodiment, the target distance is a first target distance; and the apparatus further includes: a fourth display module, configured to: after the virtual vehicle moves out of the curve, display, in the navigation interface, that the navigation map and the virtual vehicle start to evenly approach a heading-up direction until the navigation map and the virtual vehicle are in the heading-up direction when a distance from the curve that the virtual vehicle moves to is a second target distance.

In one embodiment, the apparatus further includes a fifth display module, configured to: after the virtual vehicle moves out of the curve and when the distance between the virtual vehicle and the curve is greater than the second target distance, display, in the navigation interface, that the virtual vehicle moves in the navigation map in the heading-up direction.

In one embodiment, the navigation route of the target vehicle includes the curve, and the apparatus further includes a distance determining module, configured to: use a position point on the navigation route of the target vehicle at which a curvature changes from zero to non-zero as a curve starting point of the curve; obtain curvature circle center coordinates corresponding to the curve starting point; calculate, according to the curve starting point and the curvature circle center coordinates, a deviation angle between a tangent line at the curve starting point and a heading-up direction as a deviation angle when the virtual vehicle moves into the curve; and obtain the target distance through calculation according to the deviation angle and a current travelling speed of the target vehicle.

In one embodiment, the distance determining module is further configured to: estimate, according to the current travelling speed of the target vehicle and a curvature radius corresponding to the curve starting point, a trajectory deviation amount after the virtual vehicle moves into the curve; estimate, according to the trajectory deviation amount, a vehicle position after the virtual vehicle moves into the curve; calculate, according to the vehicle position and curvature circle center coordinates corresponding to the vehicle position, an estimated deviation angle after the virtual vehicle moves into the curve; determine a deviation angle change amount of a front of vehicle angle of the virtual vehicle according to the deviation angle when the virtual vehicle moves into the curve and the estimated deviation angle after the virtual vehicle moves into the curve; and calculate the target distance according to the current travelling speed, the deviation angle when the virtual vehicle moves into the curve, and the deviation angle change amount.

In one embodiment, when the deviation is a constant speed deviation, the distance determining module is further configured to: calculate, by using the deviation angle change amount as a constant speed deviation change amount, first time required for which the constant speed deviation is performed from the heading-up direction to the deviation angle when the virtual vehicle moves into the curve; and calculate the target distance according to the current travelling speed and the first time.

In one embodiment, when the deviation is a constant acceleration deviation, after the virtual vehicle moves into the curve, the virtual vehicle sequentially passes through a first position point and a second position point in the curve; and the distance determining module is further configured to: determine a first deviation angle change amount of a front of vehicle angle of the virtual vehicle according to the deviation angle when the virtual vehicle moves into the curve and an estimated deviation angle when the virtual vehicle moves into the first position point; obtain a second deviation angle change amount of the front of vehicle angle of the virtual vehicle according to the estimated deviation angle when the virtual vehicle moves into the first position point and an estimated deviation angle when the virtual vehicle moves into the second position point; obtain a deviation acceleration of the front of vehicle angle of the virtual vehicle according to the first deviation angle change amount and the second deviation angle change amount; calculate, according to the deviation acceleration, second time required for which the constant acceleration deviation is performed from the heading-up direction to the deviation angle when the virtual vehicle moves into the curve; and calculate the target distance according to the current travelling speed and the second time.

In one embodiment, the apparatus further includes a first estimation module, configured to: estimate, according to the current travelling speed of the target vehicle and a corresponding curvature radius when the virtual vehicle moves into the curve, a trajectory deviation amount after the virtual vehicle moves into the first position point; estimate, according to the trajectory deviation amount, a vehicle position after the virtual vehicle moves into the first position point; and calculate, according to the vehicle position and curvature circle center coordinates corresponding to the vehicle position, an estimated deviation angle after the virtual vehicle moves into the first position point.

In one embodiment, the apparatus further includes a second estimation module, configured to: estimate, according to the current travelling speed of the target vehicle and the corresponding curvature radius when the virtual vehicle moves into the curve, a trajectory deviation amount after the virtual vehicle moves into the second position point; estimate, according to the trajectory deviation amount, a vehicle position after the virtual vehicle moves into the second position point; and calculate, according to the vehicle position and curvature circle center coordinates corresponding to the vehicle position, an estimated deviation angle after the virtual vehicle moves into the second position point.

In one embodiment, the apparatus further includes a route data obtaining module, configured to: obtain a real-time position of the target vehicle; display, in the navigation interface, a navigation map matching the real-time position; and obtain route curvature data of a navigation route in the navigation map, the route curvature data including a curvature, a curvature radius, and curvature circle center coordinates that correspond to each position point on the navigation route in the navigation map.

In one embodiment, the route data obtaining module is further configured to: determine a preset distance; and obtain, based on the real-time position of the target vehicle, route curvature data in the preset distance ahead of the real-time position on the navigation route in the navigation map.

In one embodiment, the route data obtaining module is further configured to: obtain real-time data acquired by a sensor arranged on the target vehicle, the sensor including at least one of a camera or a radar; and perform, based on the real-time data acquired by the sensor, positioning and calibration on the target vehicle to obtain the real-time position of the target vehicle.

In the foregoing navigation apparatus, during navigation of a target vehicle, a corresponding navigation interface is displayed, and a navigation map and a virtual vehicle that moves in the navigation map as the target vehicle travels are displayed in the navigation interface; when the virtual vehicle moves to a target distance from a curve, the navigation map and a front of vehicle direction of the virtual vehicle no longer maintain the same direction, for example, maintain heading-up direction, but start to deviate in an direction opposite to the curve; and between a moment when the virtual vehicle moves to the target distance from the curve and a moment when the virtual vehicle enters the curve, moments when both the navigation map and the front of vehicle direction of the virtual vehicle deviate in the direction opposite to the curve exist, deviation degrees of the plurality of deviations gradually increasing in time sequence. Accordingly, after the virtual vehicle moves into the curve, the navigation map and the front of vehicle direction of the virtual vehicle do not change dramatically due to a dramatic increase in a road curvature, and the navigation map does not rotate dramatically, which reduces consumption of resources for reading map data in a short time, and does not cause dizziness to a user, thereby improving user experience.

The modules in the foregoing navigation apparatus may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In one embodiment, a computer device is provided. The computer device may be a terminal or a server, and an internal structure diagram thereof may be shown in FIG. 12. The computer device includes a processor, a memory, an input/output (I/O) interface, and a communication interface that are connected through a system bus. The processor, the memory, and the input/output interface are connected through the system bus, and the communication interface is connected to the system bus through the input/output interface. The processor of the computer device is configured to provide computing and control capabilities. The memory of the computer device includes a non-volatile storage medium and an internal memory. The non-volatile storage medium has an operating system, computer-readable instructions, and a database stored therein. The internal memory provides an environment for running the operating system and the computer-readable instructions in the non-volatile storage medium. The database of the computer device is configured for storing navigation data. The input/output interface of the computer device is configured to exchange information between the processor and an external device. The communication interface of the computer device is configured to communicate with an external terminal through a network connection. The computer-readable instructions are executed by the processor to implement a navigation method.

Figure 12:
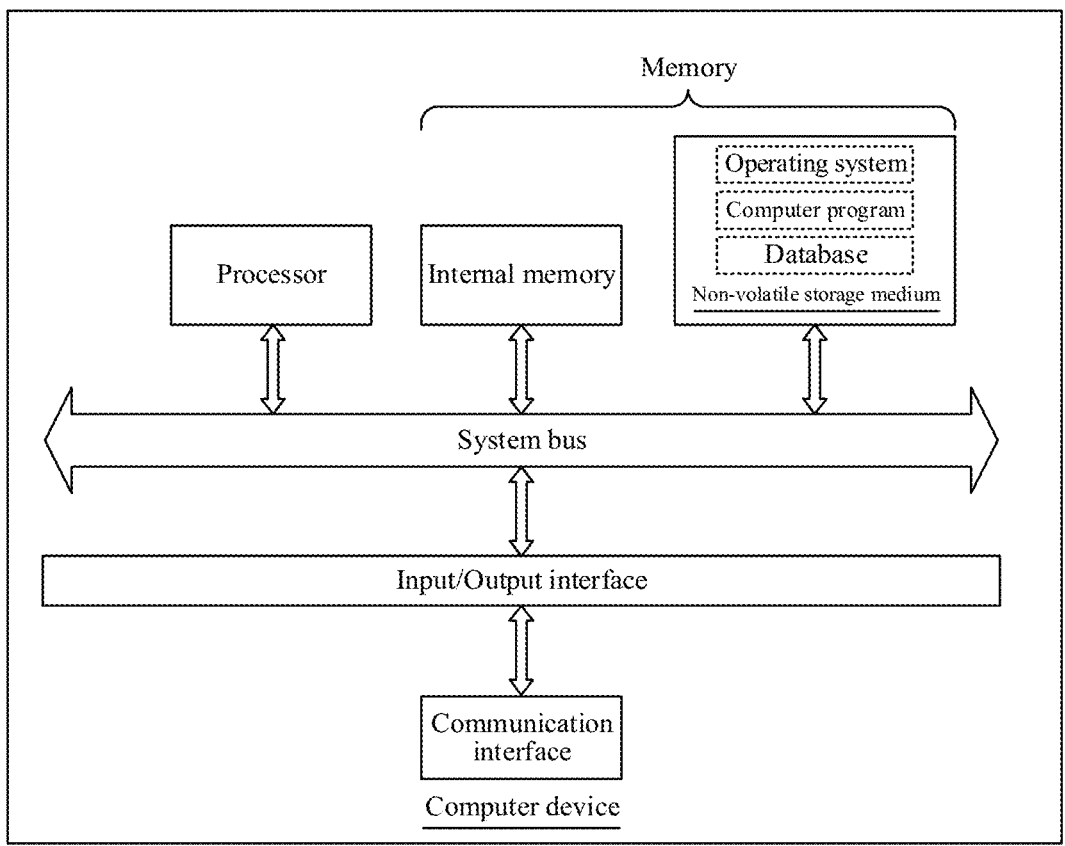
FIG. 12 is a diagram of a structure diagram of a computer device according to an embodiment of the present disclosure.

A person skilled in the art may understand that, the structure shown in FIG. 12 is only a block diagram of a part of a structure related to a solution of this application and does not limit the computer device to which the solution of this application is applied. Specifically, the computer device may include more or fewer components than those in the drawings, or some components are combined, or a different component deployment is used.

In one embodiment, a computer device is provided, including a memory and a processor, the memory having computer-readable instructions stored therein, and the processor, when executing the computer-readable instructions, implementing the operations in the foregoing method embodiments.

In one embodiment, a computer-readable storage medium is provided, having computer-readable instructions stored therein, the computer-readable instructions, when executed by a processor, implementing the operations in the foregoing method embodiments.

In one embodiment, a computer program product is provided, having computer-readable instructions stored therein, the computer-readable instructions, when executed by a processor, implementing the operations in the foregoing method embodiments.

The user information (including, but not limited to, user equipment information, user personal information, and the like) and data (including, but not limited to, data for analysis, stored data, displayed data, and the like) involved in this application all are information and data that are authorized by the user or fully authorized by each party, and the collection, use, and processing of relevant data need to comply with relevant laws and regulations of relevant countries and regions.

A person of ordinary skill in the art may understand that all or some of the procedures of the methods of the foregoing embodiments may be implemented by computer-readable instructions instructing relevant hardware. The computer-readable instructions may be stored in a non-volatile computer-readable storage medium. When the computer-readable instructions are executed, the procedures of the embodiments of the foregoing methods may be included. Any reference to a memory, a database, or another medium used in the embodiments provided in this application may include at least one of a non-volatile memory and a volatile memory. The non-volatile memory may include a read-only memory (ROM), a magnetic tape, a floppy disk, a flash memory, an optical memory, a high-density embedded non-volatile memory, a resistive random access memory (Re-RAM), a magnetoresistive random access memory (MRAM), a ferroelectric random access memory (FRAM), a phase change memory (PCM), a graphene memory, and the like. The volatile memory may include a random access memory (RAM) or an external cache. For the purpose of description instead of limitation, the RAM is available in a plurality of forms, such as a static random access memory (SRAM) or a dynamic random access memory (DRAM). The database involved in the embodiments provided in this application may include at least one of a relational database and a non-relational database. The non-relational database may include a blockchain-based distributed database, but is not limited thereto. The processor involved in the embodiments provided in this application may be a general-purpose processor, a central processing unit, a graphics processing unit, a digital signal processor, a programmable logic device, a quantum computing-based data processing logic device, and are not limited thereto.

The technical features in the foregoing embodiments may be combined in different manners to form other embodiments. For concise description, not all possible combinations of the technical features in the embodiment are described. However, as long as combinations of the technical features do not conflict with each other, the combinations of the technical features are to be considered as falling within the scope described in this specification.

The foregoing embodiments only describe several implementations of this application, and are described in detail, but they are not to be construed as a limitation to the patent scope of this application. A person of ordinary skill in the art may further make several variations and improvements without departing from the idea of this application, and the variations and improvements all fall within the protection scope of this application. Therefore, the protection scope of this application shall be subject to the appended claims.

What is claimed is:

1. A navigation method, performed by a computer device, the method comprising:
  displaying a navigation interface, the navigation interface being configured for navigating a target vehicle;
  displaying, in the navigation interface, a navigation map and a virtual vehicle that moves in the navigation map as the target vehicle travels; and
  displaying, between a moment when the virtual vehicle moves to a target distance from a curve and a moment when the virtual vehicle enters the curve, both the navigation map and a front of vehicle direction of the virtual vehicle deviate a plurality of times in a direction opposite to the curve, deviation degrees of the plurality of deviations gradually increasing in time sequence.

2. The method according to claim 1, wherein the displaying, between the moment when the virtual vehicle moves to the target distance from the curve and the moment when the virtual vehicle enters the curve, both the navigation map and the front of vehicle direction of the virtual vehicle deviate the plurality of times in the direction opposite to the curve, deviation degrees of the plurality of deviations gradually increasing in time sequence comprises: displaying, at the moment when the virtual vehicle moves to the target distance from the curve, that the navigation map and the front of vehicle direction of the virtual vehicle start to deviate in the direction opposite to the curve; and displaying, between the moment when the virtual vehicle moves to the target distance from the curve and the moment when the virtual vehicle enters the curve, that the navigation map and the front of vehicle direction of the virtual vehicle continue to deviate the plurality of times in the direction opposite to the curve, wherein the deviation degrees of the plurality of deviations being evenly increasing in time sequence.

3. The method according to claim 2, wherein that the deviation degrees of the plurality of deviations being evenly increasing in time sequence comprises that
  in a case that the deviation degrees of the plurality of deviations increase at a constant speed in time sequence, in the moments when both the navigation map and the front of vehicle direction of the virtual vehicle deviate the plurality of times in the direction opposite to the curve, deviation angle change amounts between any adjacent moments are the same.

4. The method according to claim 2, wherein that the deviation degrees of the plurality of deviations being evenly increasing in time sequence comprises that
  in a case that the deviation degrees of the plurality of deviations increase at a constant acceleration in time sequence, in the moments when both the navigation map and the front of vehicle direction of the virtual vehicle deviate the plurality of times in the direction opposite to the curve, deviation angle change between any adjacent moments increase at a constant speed.

5. The method according to claim 1, wherein the method further comprises:
  before the virtual vehicle moves into the curve and when a distance between the virtual vehicle and the curve is greater than the target distance, displaying, in the navigation interface, that the virtual vehicle moves in the navigation map in a heading-up direction.

6. The method according to claim 1, wherein the target distance is a first target distance; and the method further comprises: after the virtual vehicle moves out of the curve, displaying, in the navigation interface, that the navigation map and the front of vehicle direction of the virtual vehicle start to approach a heading-up direction until the virtual vehicle moves to a second target distance from the curve, the navigation map and the virtual vehicle are then in the heading-up direction.

7. The method according to claim 6, wherein the method further comprises:
  after the virtual vehicle moves out of the curve and when the distance between the virtual vehicle and the curve is greater than the second target distance, displaying, in the navigation interface, that the virtual vehicle moves in the navigation map in the heading-up direction.

8. The method according to claim 1, wherein a navigation route of the target vehicle comprises the curve, and operations of determining the target distance comprise:
  using a position point on the navigation route of the target vehicle at which a curvature changes from zero to non-zero as a curve starting point of the curve;
  obtaining curvature circle center coordinates corresponding to the curve starting point;
  calculating, according to the curve starting point and the curvature circle center coordinates, a deviation angle between a tangent line at the curve starting point and a heading-up direction as a deviation angle when the virtual vehicle moves into the curve; and
  obtaining the target distance through calculation according to the deviation angle and a current travelling speed of the target vehicle.

9. The method according to claim 8, wherein the obtaining the target distance through calculation according to the deviation angle and the current travelling speed of the target vehicle comprises: estimating, according to the current travelling speed of the target vehicle and a curvature radius corresponding to the curve starting point, a trajectory deviation amount after the virtual vehicle moves into the curve; estimating, according to the trajectory deviation amount, a vehicle position after the virtual vehicle moves into the curve; calculating, according to the vehicle position and curvature circle center coordinates corresponding to the vehicle position, an estimated deviation angle after the virtual vehicle moves into the curve; determining a deviation angle change amount of a front of vehicle angle of the virtual vehicle according to the deviation angle when the virtual vehicle moves into the curve and the estimated deviation angle after the virtual vehicle moves into the curve; and calculating the target distance according to the current travelling speed, the deviation angle when the virtual vehicle moves into the curve, and the deviation angle change amount.

10. The method according to claim 9, wherein when the deviation is a constant speed deviation, the calculating the target distance according to the current travelling speed, the deviation angle when the virtual vehicle moves into the curve, and the deviation angle change amount comprises:
  calculating, by using the deviation angle change amount as a constant speed deviation change amount, first time required for which the constant speed deviation is performed from the heading-up direction to the deviation angle when the virtual vehicle moves into the curve; and
  calculating the target distance according to the current travelling speed and the first time.

11. The method according to claim 8, wherein when the deviation is a constant acceleration deviation, after the virtual vehicle moves into the curve, the virtual vehicle sequentially passes through a first position point and a second position point in the curve; and the obtaining the target distance through calculation according to the deviation angle and the current travelling speed of the target vehicle comprises: determining a first deviation angle change amount of a front of vehicle angle of the virtual vehicle according to the deviation angle when the virtual vehicle moves into the curve and an estimated deviation angle when the virtual vehicle moves into the first position point; obtaining a second deviation angle change amount of the front of vehicle angle of the virtual vehicle according to the estimated deviation angle when the virtual vehicle moves into the first position point and an estimated deviation angle when the virtual vehicle moves into the second position point; obtaining a deviation acceleration of the front of vehicle angle of the virtual vehicle according to the first deviation angle change amount and the second deviation angle change amount; calculating, according to the deviation acceleration, second time required for which the constant acceleration deviation is performed from the heading-up direction to the deviation angle when the virtual vehicle moves into the curve; and calculating the target distance according to the current travelling speed and the second time.

12. The method according to claim 11, wherein the method further comprises:

estimating, according to the current travelling speed of the target vehicle and a corresponding curvature radius when the virtual vehicle moves into the curve, a trajectory deviation amount after the virtual vehicle moves into the first position point;

estimating, according to the trajectory deviation amount, a vehicle position after the virtual vehicle moves into the first position point; and calculating, according to the vehicle position and curvature circle center coordinates corresponding to the vehicle position, an estimated deviation angle after the virtual vehicle moves into the first position point.

13. The method according to claim 12, wherein the method further comprises:

estimating, according to the current travelling speed of the target vehicle and the corresponding curvature radius when the virtual vehicle moves into the curve, a trajectory deviation amount after the virtual vehicle moves into the second position point;

estimating, according to the trajectory deviation amount, a vehicle position after the virtual vehicle moves into the second position point; and calculating, according to the vehicle position and curvature circle center coordinates corresponding to the vehicle position, an estimated deviation angle after the virtual vehicle moves into the second position point.

14. The method according to claim 1, wherein the method further comprises:

obtaining a real-time position of the target vehicle;

displaying, in the navigation interface, a navigation map matching the real-time position; and obtaining route curvature data of a navigation route in the navigation map, the route curvature data comprising a curvature, a curvature radius, and curvature circle center coordinates that correspond to each position point on the navigation route in the navigation map.

15. The method according to claim 14, wherein the obtaining route curvature data of a navigation route in the navigation map comprises:

determining a preset distance; and obtaining, based on the real-time position of the target vehicle, route curvature data in the preset distance ahead of the real-time position on the navigation route in the navigation map.

16. The method according to claim 14, wherein the obtaining a real-time position of the target vehicle comprises:

obtaining real-time data acquired by a sensor arranged on the target vehicle, the sensor comprising at least one of a camera or a radar; and performing, based on the real-time data acquired by the sensor, positioning and calibration on the target vehicle to obtain the real-time position of the target vehicle.

17. A computer device, comprising a memory and a processor, the memory having computer-readable instructions stored therein, and the processor, when executing the computer-readable instructions, implementing a navigation method, the method comprising:

displaying a navigation interface, the navigation interface being configured for navigating a target vehicle;

displaying, in the navigation interface, a navigation map and a virtual vehicle that moves in the navigation map as the target vehicle travels; and displaying, between a moment when the virtual vehicle moves to a target distance from a curve and a moment when the virtual vehicle enters the curve, both the navigation map and a front of vehicle direction of the virtual vehicle deviate a plurality of times in a direction opposite to the curve, deviation degrees of the plurality of deviations gradually increasing in time sequence.

18. The computer device according to claim 17, wherein the displaying, between the moment when the virtual vehicle moves to the target distance from the curve and the moment when the virtual vehicle enters the curve, both the navigation map and the front of vehicle direction of the virtual vehicle deviate the plurality of times in the direction opposite to the curve, deviation degrees of the plurality of deviations gradually increasing in time sequence comprises: displaying, at the moment when the virtual vehicle moves to the target distance from the curve, that the navigation map and the front of vehicle direction of the virtual vehicle start to deviate in the direction opposite to the curve; and displaying, between the moment when the virtual vehicle moves to the target distance from the curve and the moment when the virtual vehicle enters the curve, that the navigation map and the front of vehicle direction of the virtual vehicle continue to deviate the plurality of times in the direction opposite to the curve, wherein the deviation degrees of the plurality of deviations being evenly increasing in time sequence.

19. The computer device according to claim 18, wherein that the deviation degrees of the plurality of deviations being evenly increasing in time sequence comprises that in a case that the deviation degrees of the plurality of deviations increase at a constant speed in time sequence, in the moments when both the navigation map and the front of vehicle direction of the virtual vehicle deviate the plurality of times in the direction opposite to the curve, deviation angle change amounts between any adjacent moments are the same.

20. A non-transitory computer-readable storage medium, having computer-readable instructions stored therein, the computer-readable instructions being executed by a processor to perform a navigation method, performed by a computer device, the method comprising:

displaying a navigation interface, the navigation interface being configured for navigating a target vehicle;

displaying, in the navigation interface, a navigation map and a virtual vehicle that moves in the navigation map as the target vehicle travels; and displaying, between a moment when the virtual vehicle moves to a target distance from a curve and a moment when the virtual vehicle enters the curve, both the navigation map and a front of vehicle direction of the virtual vehicle deviate a plurality of times in a direction opposite to the curve, deviation degrees of the plurality of deviations gradually increasing in time sequence.

* * * * *